United States Patent
Schaible et al.

(10) Patent No.: US 8,564,452 B2
(45) Date of Patent: Oct. 22, 2013

(54) RADIO-FREQUENCY IDENTIFICATION (RFID) SAFETY SYSTEM

(75) Inventors: Uwe D. Schaible, Ancaster (CA); Jonathan Fava, Burlington (CA); Peter Atef Wadie Basl, Hamilton (CA); Norman H. Von Styp-Rekowski, Oakville (CA); Jeff William Edward McDonald, Ancaster (CA); Jason Philip Garr, Pickering (CA)

(73) Assignee: Marlex Engineering Inc., Ancaster (CA)

( * ) Notice: Subject to any disclaimer, the term of this patent is extended or adjusted under 35 U.S.C. 154(b) by 337 days.

(21) Appl. No.: 13/052,466

(22) Filed: Mar. 21, 2011

(65) Prior Publication Data
US 2011/0227748 A1   Sep. 22, 2011

Related U.S. Application Data

(60) Provisional application No. 61/315,657, filed on Mar. 19, 2010.

(51) Int. Cl.
*G08B 21/00* (2006.01)

(52) U.S. Cl.
USPC .............. 340/686.6; 340/539.11; 340/539.13; 340/572.1; 340/572.4; 340/572.8

(58) Field of Classification Search
USPC ............................. 340/686.6, 539.11, 539.13, 340/572.1–572.8
See application file for complete search history.

(56) References Cited

U.S. PATENT DOCUMENTS

| | | | | |
|---|---|---|---|---|
| 4,646,089 A | * | 2/1987 | Takanabe et al. | 340/995.24 |
| 4,949,268 A | * | 8/1990 | Nishikawa et al. | 701/454 |
| 6,614,721 B2 | * | 9/2003 | Bokhour | 367/128 |
| 6,621,417 B2 | | 9/2003 | Duncan et al. | |
| 7,002,461 B2 | | 2/2006 | Duncan et al. | |
| 7,212,120 B2 | * | 5/2007 | Gudat | 340/572.1 |
| 7,298,258 B1 | | 11/2007 | Hudgens et al. | |
| 2008/0018472 A1 | | 1/2008 | Dasilva et al. | |

OTHER PUBLICATIONS

Brooks, The Magic Forklift, OkanaganBusiness Examiner, Jun. 25, 2010, downloaded from http://www.castanet.net/news/Business-Examiner/55289/The-magic-forklift.

* cited by examiner

*Primary Examiner* — Tai T Nguyen
(74) *Attorney, Agent, or Firm* — Borden Ladner Gervais LLP; Jeffrey W. Wong

(57) ABSTRACT

A system and method for alerting operators of mobile equipment to the presence of people in monitored areas around the periphery of the mobile equipment they are operating is provided. The system includes an RFID detection system which is installed on the mobile equipment and alerts the operator to the presence of people wearing Personal Protection Equipment containing RFID safety tags. The system also includes a tag programming system which allows RFID safety tags to be created. The system also includes a tag testing system which allows a person to test the functionality of the RFID safety tags contained in the personal safety equipment they are wearing. The system also includes RFID personal safety equipment such as 3D safety vests and RFID hardhats which contains RFID safety tags. The 3D safety vests also include enhanced 3D visual markings.

16 Claims, 20 Drawing Sheets

RADIO-FREQUENCY IDENTIFICATION (RFID) SAFETY SYSTEM

CROSS-REFERENCE TO RELATED APPLICATIONS

This application claims the benefit of U.S. Provisional Patent Application No. 61/315,657, filed Mar. 19, 2010, which is hereby incorporated by reference in its entirety.

FIELD OF THE DISCLOSURE

The disclosure is directed in general to safety systems, and more particularly, to a radio-frequency identification (RFID) safety system.

BACKGROUND OF THE DISCLOSURE

Each year there are injuries and fatalities at work sites due to construction equipment, or vehicles, backing into workers who must work around such equipment or who must cross the equipment's path during the course of their regular activities. This is largely due to the blind spots on construction equipment, especially to the rear. Although good worksite planning and safety procedures exist, dangers still exist for humans working near such equipment.

Aids such as mirrors and reversing alarms are routinely employed to reduce the risk to workers on foot. Even with mirrors, large areas surrounding the equipment are still hidden from the operator of the equipment, such as the rear area. Reversing alarms may alert a worker on foot that there is danger but this requires the worker to be alert and able to move out of danger. If a worker is injured or dazed or simply not quick enough, they may not be able to move to safety in time. Camera systems are often employed to provide the operator of the equipment with an enhanced field of view, yet camera systems provide only a passive indication of potential dangers and rely on the operator to view and comprehend the displayed camera image. Active warning systems, such as Ultrasonic, Radar and Laser based obstacle detection systems are also employed to alert the operator of the presence of an obstacle in the path of the equipment. Such systems cannot distinguish what kind of obstacle is being detected, and are thereby ineffective in differentiating between a critical asset, such as a human, and a non-critical asset such as a pile of dirt or rocks. The use of Ultrasonic, Radar and Laser based obstacle detection systems in a construction environment is also prone to nuisance alarms. The detection elements of Ultrasonic, Radar and Laser based obstacle detection systems must be positioned so that the resulting detection area is free of obstacles and clear of the ground. Such resulting element positioning makes these systems ineffective in the detection of a worker lying on the ground, or in very close and low proximity to the equipment.

In light of these situations, there is a need for an RFID safety system that overcomes disadvantages of the prior art.

BRIEF DESCRIPTION OF THE DRAWINGS

The preferred embodiments of the disclosure will hereinafter be described in conjunction with the appended drawings provided to illustrate and not to limit the disclosure, wherein like designations denote like elements, and in which.

DETAILED DESCRIPTION OF THE DISCLOSURE

While preferred embodiments of the disclosure have been illustrated and described, it will be clear that the disclosure is not limited to these embodiments only. Numerous modifications, changes, variations, substitutions and equivalents can be made without departing from the spirit and scope of the disclosure.

Figure 1:
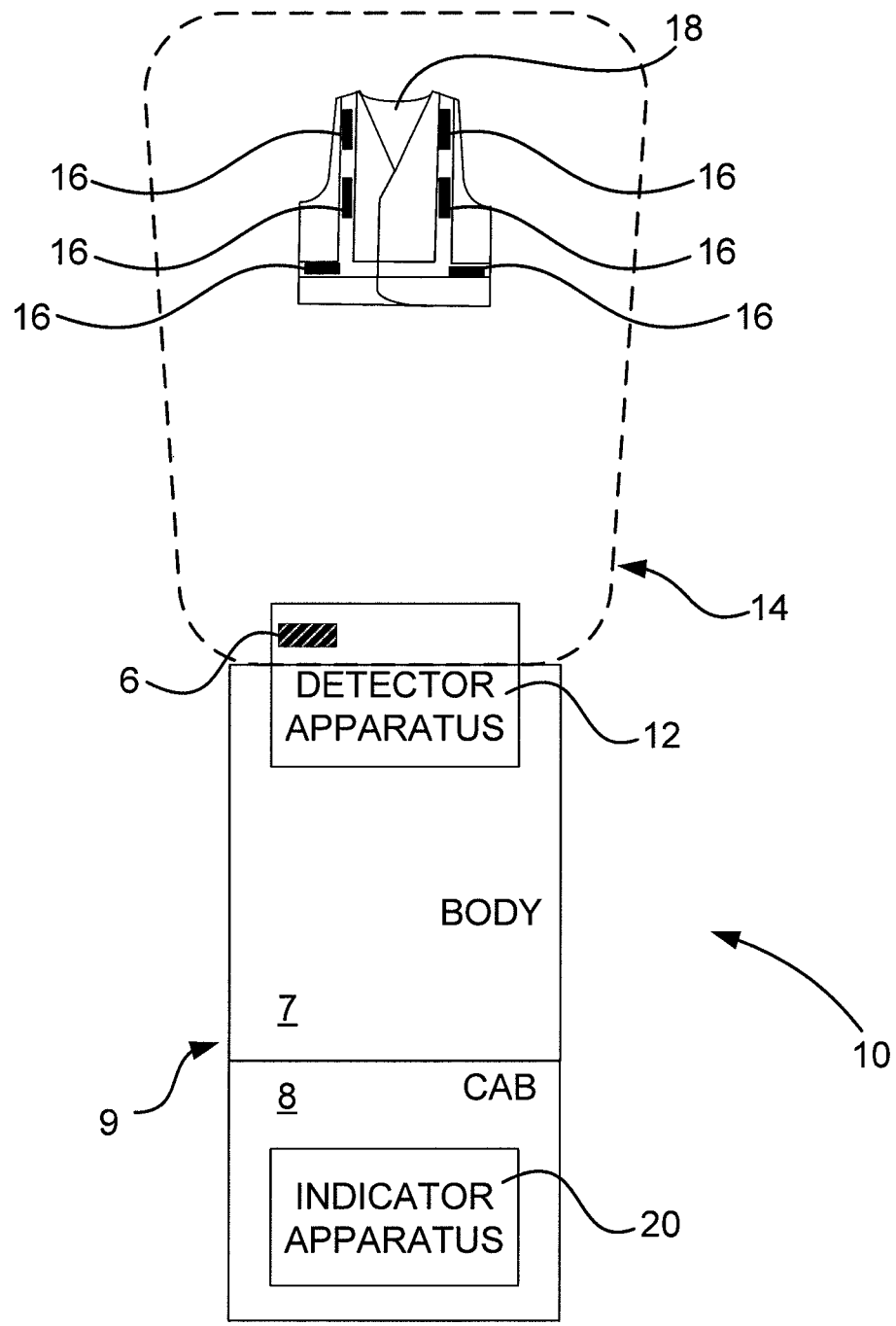
FIG. 1 is a schematic view of the components of an radio-frequency identification (RFID) detection system for use in an RFID safety system.

As shown in FIG. 1, a radio-frequency identification (RFID) safety system is described, one part of which includes an RFID detection system (10) for installation on a piece of mobile equipment or vehicle (9), such as, but not limited to, a road grader, a loader, a forklift, a bulldozer, a dump truck and the like. Although vehicles for use in construction sites are listed, the RFID safety system may be used in any application where human safety is important and heavy (mobile or stationary) equipment is used. The RFID detection system (10) includes a detector apparatus (12) located, or mounted, along the periphery of the mobile equipment (9) in an area to be monitored such as at the rear of the mobile equipment. In one embodiment, the detector apparatus (12) is powered by the electrical system of the mobile equipment and monitors a detection zone (14) for the presence of a single or a plurality of RFID safety tags (16) which have been integrated or inserted into personal safety clothing (18) such as a safety vest or a safety helmet and the like. When at least one RFID safety tag (16) is detected by the detector apparatus, a signal is sent or transmitted by the detector apparatus (12) to an indicator apparatus (20) either through a wired communication interface or a wireless communication interface. Upon receipt of a signal from the detector apparatus (12) indicating the detection of the RFID safety tag (16), the indicator apparatus (20) emits a visual or audio alert, or a combination of both, to alert the operator of the vehicle (9) of the presence of an item of personal safety clothing (18) in the area being monitored by the system thereby indicating the likely presence of a human being as well. In this manner, there is improved safety for workers who are working in the same area as large mobile equipment such as on a construction site, especially where visibility for mobile equipment operators is poor. In one embodiment, the detector apparatus (12) is located on a vehicle body (7) and the indicator apparatus (20) is located within a cab (8) of the vehicle (9).

Although not necessary for the basic operation of the RFID system, the detector apparatus (12) may also include at least one throughput detection RFID tag (6).

Figure 2:
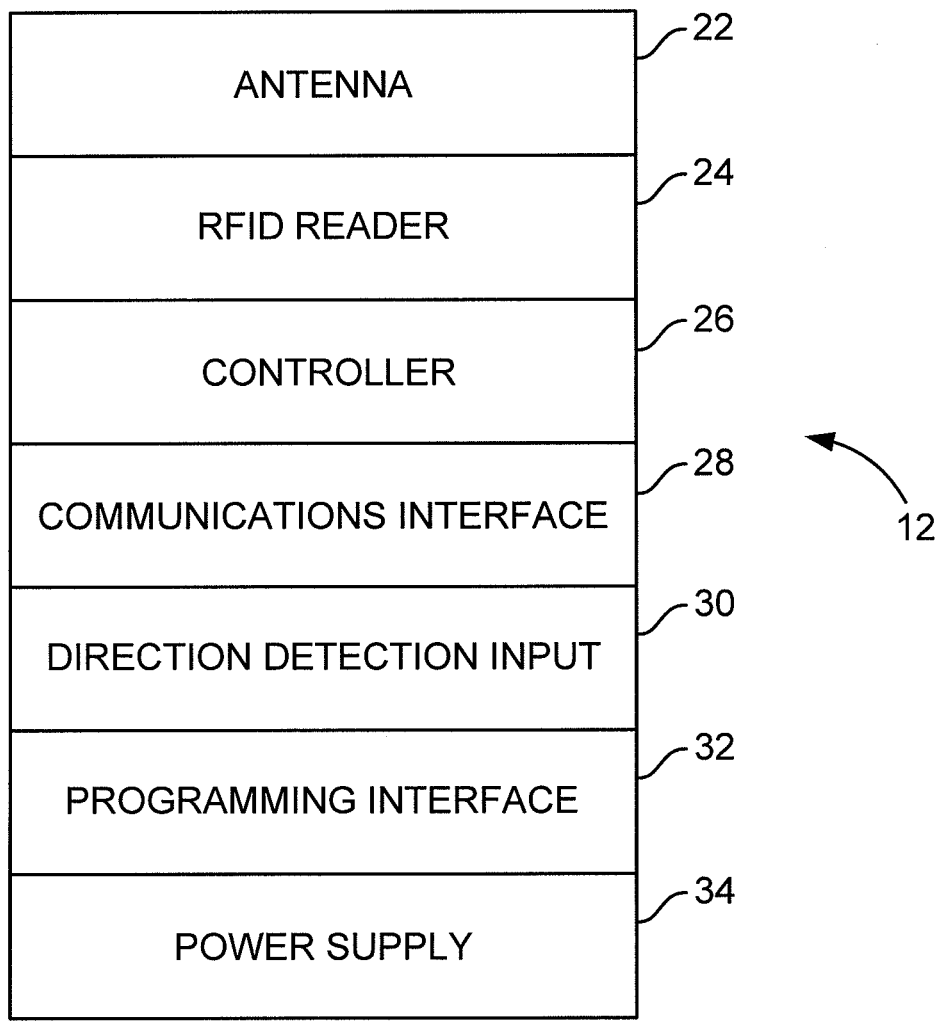
FIG. 2 is a block diagram of the detector apparatus of FIG. 1.

FIG. 2 provides a block diagram of the detector apparatus (12). The detector apparatus (12) includes an antenna (22) which is designed to provide, or create, the detection zone (14) such as a shaped radio-frequency (RF) field such that when connected to or in communication with an RFID reader (24), the detection zone (14) for detecting RFID safety tags (16) is created. The antenna (22) will be described in more detail below.

In operation, the RFID reader (24), through the antenna (22), communicates with or searches for any RFID safety tags (16) located in the detection zone (14). In other words, the RFID scans the detection zone (14) to determine the presence of RFID tags (16). When a single or plurality of RFID safety tags (16) is or are detected, the information on them is read by the RFID reader (24) and sent to a controller (26) or processor within the detector apparatus (12). The information on these tags (16) may include, but is not limited to, the type of safety clothing (18) associated with the detected tag, the name of the worker associated with the safety clothing, the identification of the tag (tagID) or the location of or distance between the tag with respect to the mobile equipment (9) or detector apparatus (12) or a combination of this information. The controller (26) then processes the information received from the RFID reader (24) and a signal, indicating the detection of the RFID safety tag (16), is transmitted to the indicator apparatus (20) via a communication interface (28) such as a wireless interface or transceiver or a wired interface.

In one embodiment, if the communication interface (28) is a wired interface, the interface may use electrical, optical, or other forms of communications to communicate with the indicator apparatus (20).

In another embodiment, the controller (26) may determine if the RFID tag that has been sensed is a valid tag before transmitting the signal. This process is described in more detail below.

The controller (26) may also perform periodic checks relating to the operational status of the overall RFID detection system (10). The results of these checks may be transmitted to the indicator apparatus (20) via the communication interface (28). The controller (26) may also perform other functions required to initialize and maintain the proper operation of the detector apparatus (12). Implementation of the controller (26) and its functionality may be in many ways and such implementations include, but are not limited to, microcontrollers, hardwired circuits, application specific integrated circuits (ASICs) or field programmable gate arrays (FPGAs).

Direction detection input circuitry (30) within the detection apparatus (12) periodically transmits a signal to the controller (26) indicating the direction of the vehicle. Determination of the direction of the mobile equipment (9) may be via GPS technology, forward/reverse gear select signals, wheel sensors, motion sensors, accelerometers, and engine control unit interface or other known technologies.

The signal from the direction detection input circuitry (30) may be used to stop or prevent detected tag information from being sent to the indicator apparatus (20), or to reduce or prevent tag reading operation altogether if the mobile equipment is idle or not moving in a desired direction. The check for idling may be performed with the assistance of the engine control unit, motion sensors or accelerometers. In other words, the direction detection input circuitry (30) may be used to reduce the likelihood of generating nuisance alarms from readings of RFID tags (16) when workers are near the non-moving equipment. Alternatively, the tag detection information may always be sent to the indicator apparatus (20) and information from the direction detection input circuitry (30) may additionally be sent to the indicator apparatus (20) where it can be further processed to determine if an audio or visual alarm needs to be transmitted. A programming interface (32) allows the firmware in the detection apparatus (12) to be programmed or updated. This may be achieved either through a physical electrical or optical connection to the system or through wireless communication technology. A power supply (34) within the detector apparatus (12) is connected to the mobile equipment's electrical system to produce the necessary voltage levels to operate the electronics in the detector apparatus (12). The power supply is connected to the mobile equipment's electrical system such that it is powered up any time the mobile equipment's ignition is turned on. Alternatively, the detector apparatus (12) may be powered by a discrete, or independent, power supply (34)

Communication between the detector apparatus (12) and the indicator apparatus (20) may be via a known communication protocol such as the ZigBee™ communication protocol; however, other protocols including proprietary protocols may also be used without affecting the scope of this disclosure. The ZigBee™ protocol is a high level low power protocol based on the IEEE 802.15.4-2003 standard for wireless personal area networks.

In a preferred embodiment, each detector apparatus (12) is paired with a single indicator apparatus (20) in a one-to-one relationship so that it may only communicate with one indicator apparatus (20) so that false signals are not received. In other words, so that the indicator apparatus (20) does not receive or process a signal from the detector apparatus (12) located on another vehicle such that a false warning is issued to the operator of the first vehicle. This can be done at the time the two units are programmed or during installation of the RFID system in the field. The pairing is preferably performed with the assistance of the communication interface (28).

In order to continuously improve the system, the detector apparatus (12) and indicator apparatus (20) are preferably both capable of being updated even after installation in the field. Updates, such as software updates, may be distributed through a variety of ways, including but not limited to, downloaded from the internet, USB key, CDROM, DVD, Blu-ray disk, or floppy disk. Distribution of the software may also be restricted to authorized parties in a variety of ways, including but not limited to, a web portal on the Internet available to customers and distributors of the detector apparatus (12) and indicator apparatus (20), on site programming by technical representatives, or encrypted media with a password. A portable PC, laptop, tablet, or smartphone based software program may be used to set up and configure the detector apparatus (12) and indicator apparatus (20) in the field.

A remote or wired interface is used to configure system parameters including, but not limited to, direction detection input, RFID reader power level, RFID reader modulation depth, RFID reader frequency range and bandwidth, throughput detection thresholds and performance targets, pairing assignments, MAC address, network ID, node names, audible alerts, vehicle and site information, communication channel and other performance and data tracking related parameters. Such software may also be used to deploy firmware updates, download statistical operation data and initiate and perform automatic tuning and diagnostics of an operational RFID safety system. The automatic tuning and diagnostic features of this software may utilize the detection of a piece of reference personal safety clothing (18) containing one or more RFID safety tags (16), located at a known distance from the detector apparatus (12).

In one embodiment, pairing a detector apparatus (12) and an indicator apparatus (20) will only allow communication to take place between the two units that are paired together in either a unidirectional or bidirectional manner. Messages that the indicator apparatus (20) may receive from the detector apparatus (2), include but are not limited to, heartbeat messages (as will be described below), fault status messages, or tag detection messages.

In operation, RFID safety tags (16) are detected by the detector apparatus (12) when they are in the detection zone (14), or the RFID field created by the antenna (22). Each RFID safety tag (16) may comprise a number of non-volatile memory banks which may retain any data written to them either during the time when the safety tag (16) was programmed or if it is updated in the field. The detector apparatus (12) works by sending out pulses which will energize any RFID tags which are in the detection zone (14). Once this pulse has been sent out, the detector apparatus (12) listens for a response from any RFID safety tags (16). The functionality and operation of RFID safety tags (16) in the presence of an RF field is understood by those familiar in the art and may be employed in this system. Future communication protocols between RFID tags and RFID readers may also be employed.

Each RFID safety tag (16) contains a unique electronic product code (EPC) which is transmitted back to the detector apparatus (12) when an RFID tag (16) responds to a pulse from the detector apparatus (12). This EPC code is checked by the detector apparatus (12), typically by the controller (26) to determine if the tag detected in the field is a valid RFID safety tag (16). An RFID safety tag (16) is considered valid if certain memory contents of the RFID safety tag (16) correspond to expected values which are written to each RFID safety tag (16) during the time of programming. In other words, the information stored in the RFID tag may be compared with expected values which are stored within the detector apparatus (12) either in memory or the controller (26). Each RFID safety tag (16) is initially programmed before being commissioned for use in the field. In another embodiment, any RFID tag that is detected may be considered to be a valid tag even without any previous programming so that the audio or visual alarm may be transmitted once an RFID tag is sensed. In another embodiment, the RFID tag may contain a unique and non-modifiable serial number which may be used as the basis for a proprietary or publicly known algorithm to form a digital signature that is programmed to a modifiable area of the RFID tag. Upon detection, the digital signature may be checked against the serial number to determine if the detected RFID tag is a valid RFID tag. This may reduce or prevent the number of nuisance alarms which may occur and also to reduce or prevent the use of counterfeit RFID tags.

The direction detection input to the indicator apparatus (20), or in other embodiments the direction detection input to the detector apparatus (12) may modify the behavior of the indicator apparatus (20). For instance, when an RFID safety tag (16) is detected by the detector apparatus (12), this event is signaled to the indicator apparatus (20). If the indicator apparatus (20) detects or is notified by the detector apparatus (12) or direction detection input circuitry (30) that the mobile equipment is currently in reverse, the indicator apparatus (20) may respond to the RFID tag detection by producing an audio and visual alarm for a period of time to alert the operator of the mobile equipment (9). By determining that the vehicle is in reverse, there are likely blind spots where the operator may not be able to see human workers so it is preferred that the alert is clear to the vehicle operator. If the mobile equipment is not detected to be in reverse, then only a visual alarm may be produced for a period of time as there is less concern with human workers behind the vehicle if it is moving forward. Many variations in the specific signaling behavior of the indicator apparatus (20) when RFID tags (16) are detected are possible and do not affect the scope of the disclosure.

As an added optional safety operating device feature, the operator of the unit or vehicle may be made aware of any system faults during operation. Therefore, the system may include apparatus for real time fault monitoring and fault status indication. To address this issue, the detector apparatus (12) may continually send a heartbeat signal at regular intervals to the indicator apparatus (20) indicating the operational status of the detector apparatus (12). This heartbeat signal may simply be a signal to confirm that the communication interfaces of the detector apparatus (12) and the indicator apparatus (20) are working properly. This information is combined with the operational status of the indicator apparatus (20) itself and the overall status of the system is indicated, or displayed, to the operator of the vehicle (9). The absence of the heartbeat signal may be used to indicate a failure of the detector apparatus (12) such that the operator would either need to use extra caution when operating the vehicle or that the detector (12) or indicator apparatus (20) should be checked immediately. Other embodiments of this system are possible that do not use a heartbeat signal and therefore, do not assume any fault in the detector apparatus (12) if a prolonged period of inactivity occurs. The idea of a heartbeat signal can be expanded to systems containing multiple detector apparatuses (12) or multiple indicator apparatuses (20) or a combination of both.

In one example of how the fault system may be implemented, each time a heartbeat is sent from the detector apparatus (12), an internal software timer, which may be seen as a heartbeat timing, is strobed and reset at the indicator apparatus (20). If the heartbeat timer is allowed to time out as a result of not receiving a heartbeat signal, the detector apparatus (12) may be assumed to be functioning incorrectly. If multiple detector apparatus (12) are communicating with a single indicator apparatus (20) the individual heartbeat signals may include an identifier to differentiate the different heartbeat signals. Under the normal operation of the system, the indicator apparatus (20) power indicator is displayed as solid green. In the event that a system fault has occurred on the detector apparatus (12), the power indicator may be displayed as flashing amber. This system allows the indicator apparatus (20) to monitor and display the health of the detector apparatus (12) in real time. Additional visual indicators are reserved on the indicator apparatus (20) for the implementation of status and error codes. These error codes may be used to determine the type of fault and for providing troubleshooting information about the system.

The detector apparatus (12) may also contain a real-time monitoring mechanism to ensure that RFID safety tags (16) can actually be detected. Without such a mechanism, a faulty or de-tuned antenna (22) may generate false negative detections, thereby jeopardizing the ability or accuracy of the RFID detection system (10) to detect personal safety clothing (18) via the tags (16). In a preferred embodiment (such as schematically shown in FIG. 1), one or more uniquely identified throughput detection RFID tags (6) are permanently mounted inside the detection zone (14) of a non-faulty, tuned antenna. The throughput tags (6) may be mounted within the detector apparatus (12) or on the body of the vehicle (9) but within the detection zone (14). The throughput detection RFID tag (6) detection performance is monitored in real-time by the detector apparatus (12) and compared to a minimum performance threshold that is either factory programmed or programmed on-site by a technical representative. In a preferred embodiment, the RFID safety tags (16) in the personal safety clothing (18) may be of the type ISO-1800-6C, also known as EPC Global Class 1 Gen 2 tags. In such an embodiment, ISO-1800-6B tags may be used as the throughput detection RFID tag (6). The RFID reader (24) in the detector apparatus (12) can be configured, either via software, hardware or firmware, to read only ISO-1800-6B tags or only ISO-1800-6C tags. In one embodiment, the RFID reader (26) is configured to read ISO-1800-6B tags in cases where the equipment is not moving in a direction requiring the detection of personal safety clothing (16), or in cases where an immediate system detection health check is requested. When scanning for a throughput detection RFID tag (6), the power setting is reduced to scan for tags only in the near field, thereby preventing or reducing unwanted throughput detection RFID tag (6) reads from nearby equipment. If a throughput detection RFID tag (6) is not read after a certain configurable threshold number of attempts, then a system throughput detection health test failure alarm may be generated and reported to the indicator apparatus (20). Use of throughput detection health testing allows for the verification of end-to-end system operation in real time.

Like the detector apparatus (12), the indicator apparatus (20) may be able to monitor its own health and display any faults to the operator in real time. The internal hardware of the indicator apparatus (20) is responsible for setting the power indicator state. If the internal hardware is functioning properly the power indicator state may be set as solid green. In the event that the indicator apparatus (20) is not functioning correctly, the power indicator on the indicator apparatus (20) may be solid red. Under these circumstances, the remaining visual indicators may remain off since the hardware of the indicator apparatus (20) is assumed not to be functioning correctly and displaying any fault status code via the additional indicators may not be possible.

Figure 3:
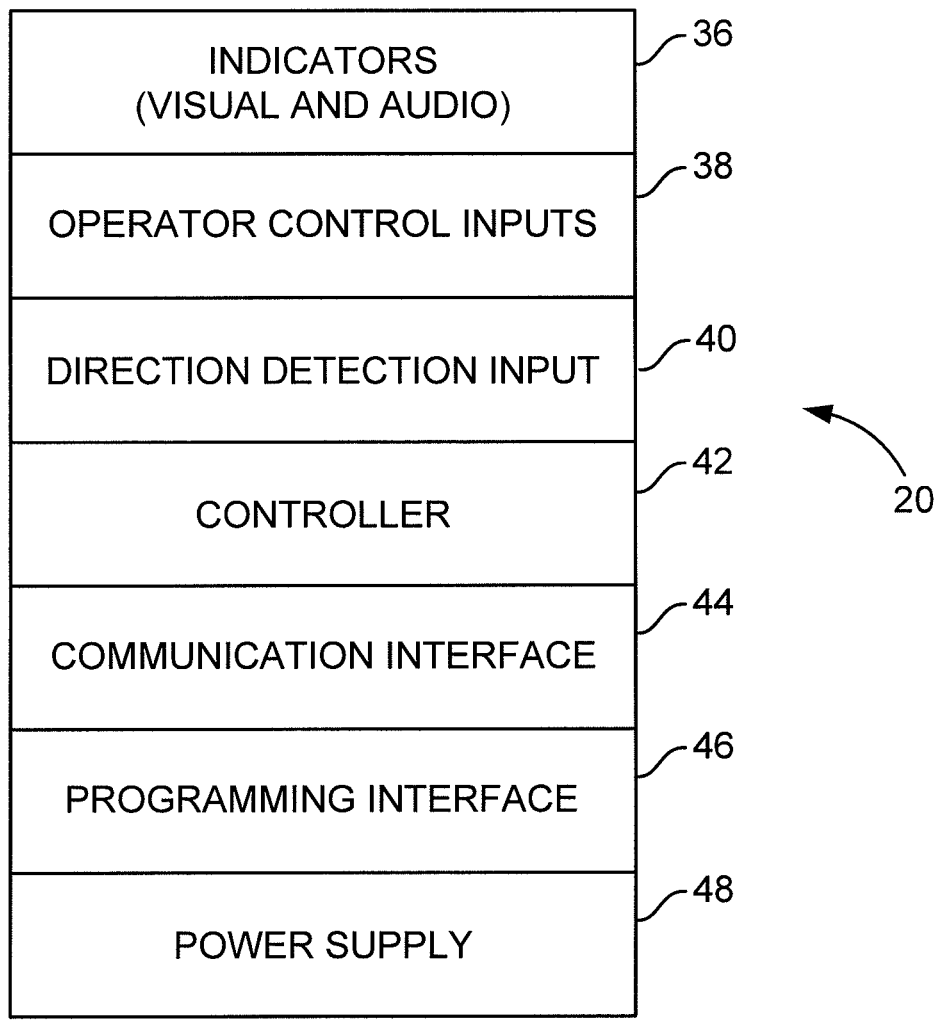
FIG. 3 is a block diagram of an indicator apparatus for use in the RFID detection system.

FIG. 3 illustrates a block diagram of one embodiment of the indicator apparatus (20). The visual and audio indicators (36) are used to alert the operator to the presence of RFID safety tags (16) in the detection zone (14) and also to display the status of the system such as described above. Operator control inputs (38) are used to control the functionality of the system such as the volume of the audio indicator. Inputs from the controls may also be transmitted back to the detector apparatus (12) via the wireless transceiver (or the wired interface) in order to modify its functionality assuming that bidirectional communication has been set up between the indicator apparatus (20) and at least one detector apparatus (12). The direction detection input (40) sends a signal to the controller indicating the direction of travel of the mobile equipment such as forward, reverse, North, South, East or West or directions therebetween. The direction detection input circuitry is optional and may also be used to stop detected tag information from being indicated on the visual or audio indicators when the mobile equipment is not travelling in a certain direction. Alternatively, this information may be determined and transmitted by the detector apparatus (12) as previously described. The controller (42) controls the operation of the indicator apparatus (20). In particular, it monitors the communication interface (44) (either wired or wireless) for detected tag information from the detector apparatus (12) and when such information is received, it modifies the visual and audio indicators to alert the operator accordingly. The controller (42) may also modify the type of visual or audio indication based on the status of the direction detection input (40) (e.g. turn off audio indication of a detected tag if the mobile equipment is not travelling in a certain direction) or the status of the direction detection input on the detector apparatus (12). Additionally, the controller initializes other components of the indicator apparatus (20) and monitors their operational status. This status, as well as the status of the detector apparatus (12) may be indicated to the operator through the visual and audio indicators (36). The indicator apparatus (20) further includes a programming interface (46) in order to allow the indicator apparatus to be programmed according to user parameters. Other physical means of implementing the programming interface, such as optical and radio frequency communications may be used so that the programmer does not have to be onsite to update the system. The power supply (48) is connected to the mobile equipment's electrical system and takes the voltage level of that electrical system and converts it to what is required to operate the electronics in the indicator apparatus (20) although it may also be a stand-alone power supply.

Figure 4:
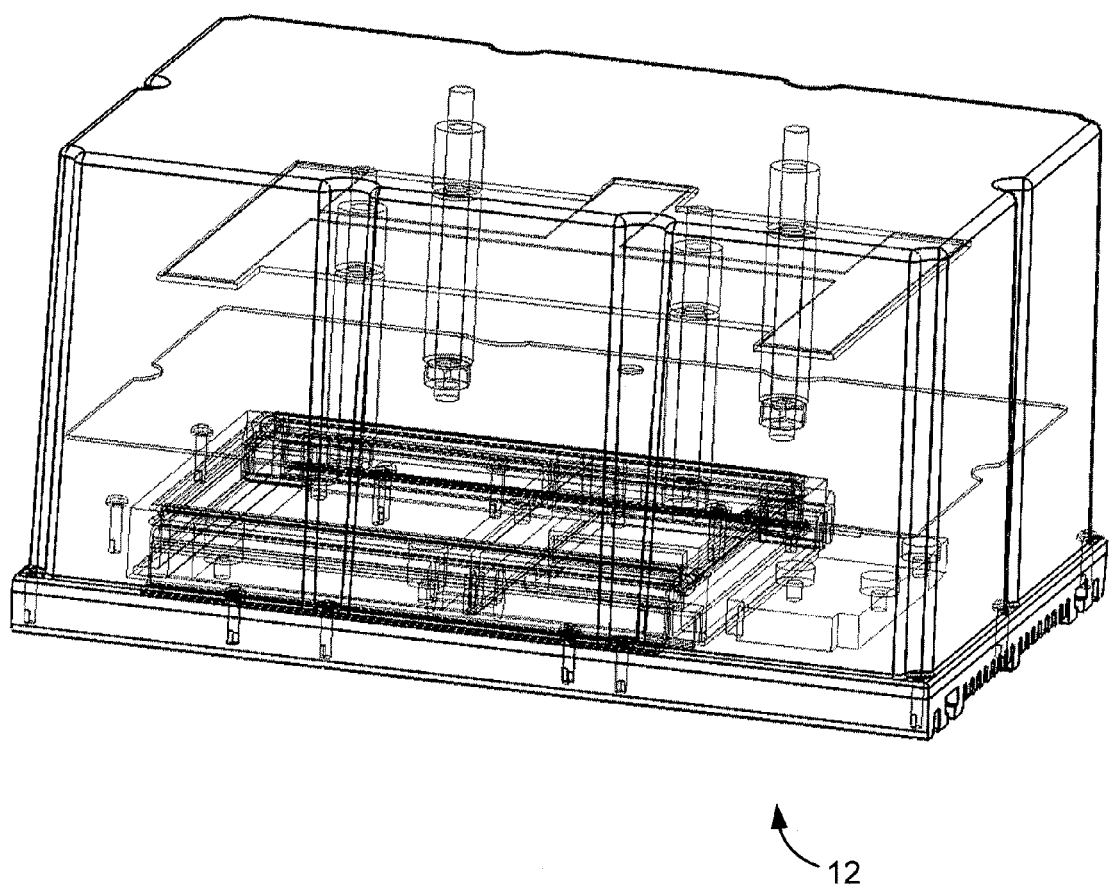
FIG. 4 is an assembled view of the detector apparatus used in the RFID detection system.
Figure 5:
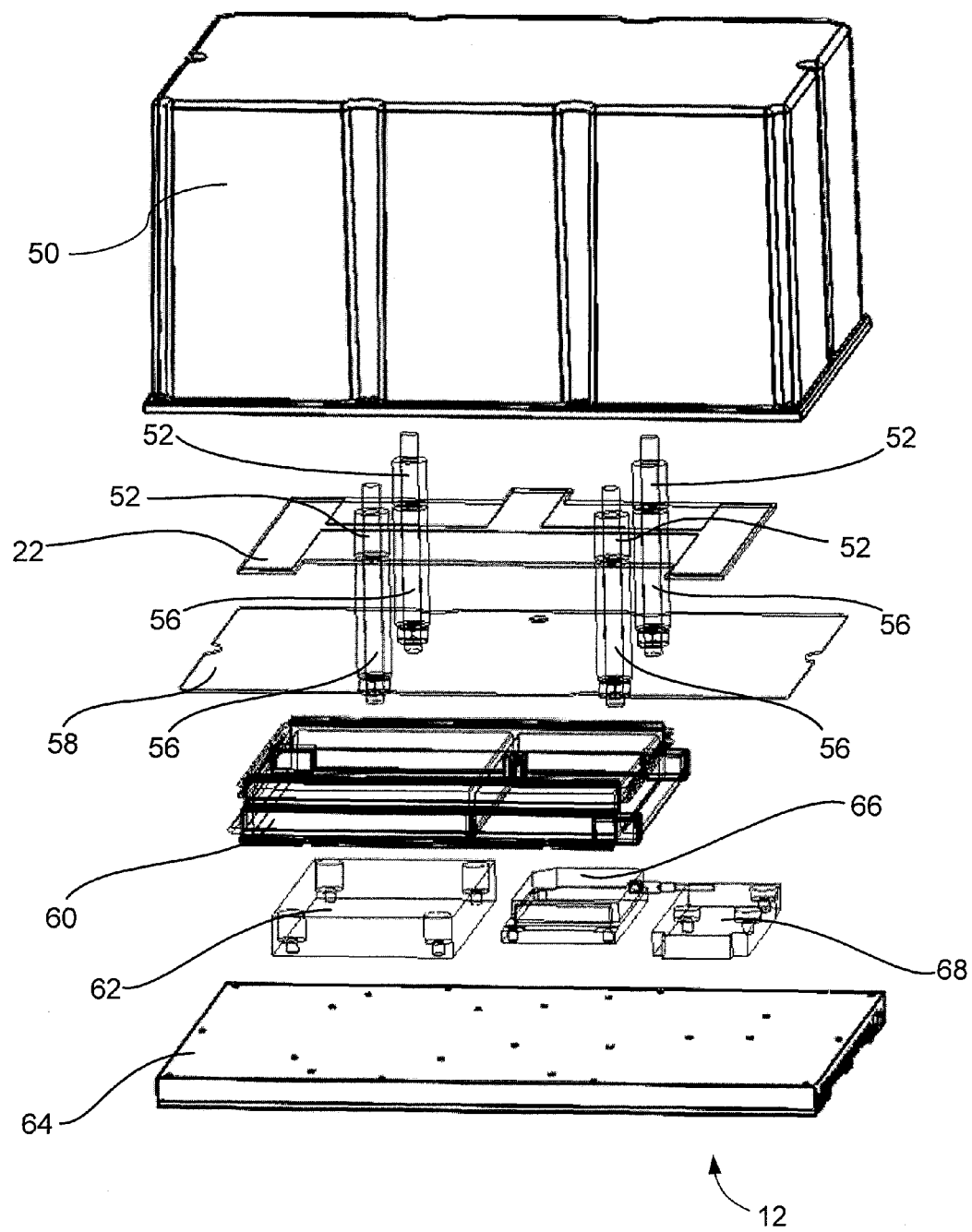
FIG. 5 is an exploded view of the detector apparatus of FIG. 4.

FIG. 4 illustrates an assembled embodiment of a detector apparatus (12) while FIG. 5 illustrates an exploded view of the detector apparatus of FIG. 4. The detector apparatus (12) further includes a heatsink plate (64) which is preferably a metal plate that provides or serves as a base for mounting the other components and acts as a heatsink to remove heat from the components. In one embodiment, the heatsink plate (64) is made of a corrosion resistant metal such as anodized aluminum since it is exposed to the elements. The bottom of the heatsink plate (64) may be shaped to increase the efficiency of heat transfer to the ambient environment. A power supply module (62), which forms part of the power supply (34) is mounted to the heatsink plate (64) and its electrical ground plane is connected to the heatsink plate (64). Although not shown, wires from the mobile equipment's electrical system may be connected to the power supply module (62). The power supply module (62) provides protection circuits and regulates the input voltage from the mobile equipment to the various voltage levels required by the other components in the system. Preferably, some form of high efficiency step down regulator may be used to minimize heat dissipation in the power supply module (62).

The power supply module (62) is connected to a RFID reader module (66) to provide power at appropriate voltage and current levels to operate the RFID reader module (66). The RFID reader module forms part of the RFID reader (24). Another set of wires from the power supply module (62) may connect to a wireless module (68), which is a part of the communication interface (28) to provide the appropriate voltages at the required current levels to operate the wireless module (68). In this embodiment, the wireless module (68) contains a microcontroller which may also be used as the controller (26) for the detector apparatus (12). Alternatively, the controller may also be located on a different board. A set of wires from the RFID reader module (66) to the wireless module (68) allows communications between the modules (and the controller). A metal shield (60) covers the power supply module (62) and the RFID reader module (66) (and if located on a separate board, the controller) and is electrically connected to the heatsink plate (64). The metal shield (68) reduces the electromagnetic interference (EMI) noise from the enclosed modules from interfering with communications with the RFID safety tags (16). The wireless module (68) is not shielded since it should emit and receive RF signals in order to communicate with the indicator apparatus (20). A reflector plate (58) is suspended above the heatsink plate (64), the power supply module (62), the RFID reader module (66), the wireless module (68), and the metal shield (60) by reflector plate spacers (56). These spacers (56) are non-conductive and their length and material composition are selected to help shape the detection zone (14) of the detector apparatus (12). The reflector plate (58) is preferably metal and is electrically isolated from the rest of the detector apparatus (12). The antenna (22) is suspended above the reflector plate (58) by the antenna spacers (52). These spacers (52) are non-conductive and their length and material composition is selected to help shape the detection zone (14) of the detector apparatus (12). In a preferred embodiment, the antenna (22) is connected to the RFID reader (24) or RFID reader module (66) through a coaxial cable.

In a preferred embodiment, a 50 Ohm RG316 single braid shield coaxial cable with a length range of between 9.00"-13.00" is used, though other embodiments could use different types and lengths of cable. The antenna (22) allows the RFID reader (24) to communicate with the RFID safety tags (16) and comprises a conductive metal pattern that is designed to shape the detection zone (14) of the detector apparatus (12). The spacing of the reflector plate (58), the dimensional size of the reflector plate (58), the spacing of the antenna (22), the pattern of the antenna (22), the coaxial cable length, cable routing and connection between the antenna (22) and the RFID reader module (66), and the power level, modulation depth and frequency range that the RFID reader module (66) is set to, are factors relating to the creation of the detection zone (14). These design parameters are carefully designed, simulated, and tested. This may be performed via simulation software and empirical testing. Some adjustable variables include, but are not limited to power level, modulation depth and frequency range. In one embodiment, a non-conductive weatherproof cover (50) encloses the components of the detector apparatus (12) and is sealed to the heatsink plate (64). Weatherproof bulkheads in the weatherproof cover (50) are used to bring wires into the detector apparatus (12). The antenna spacers (52) connect the assembly of the antenna (22), reflector plate spacers (56), and reflector plate (58) to the weatherproof cover (50). Also, the spacing between the antenna (22) and the weatherproof cover (50) is a factor relating to the creation of the detection zone (14).

Figure 6:
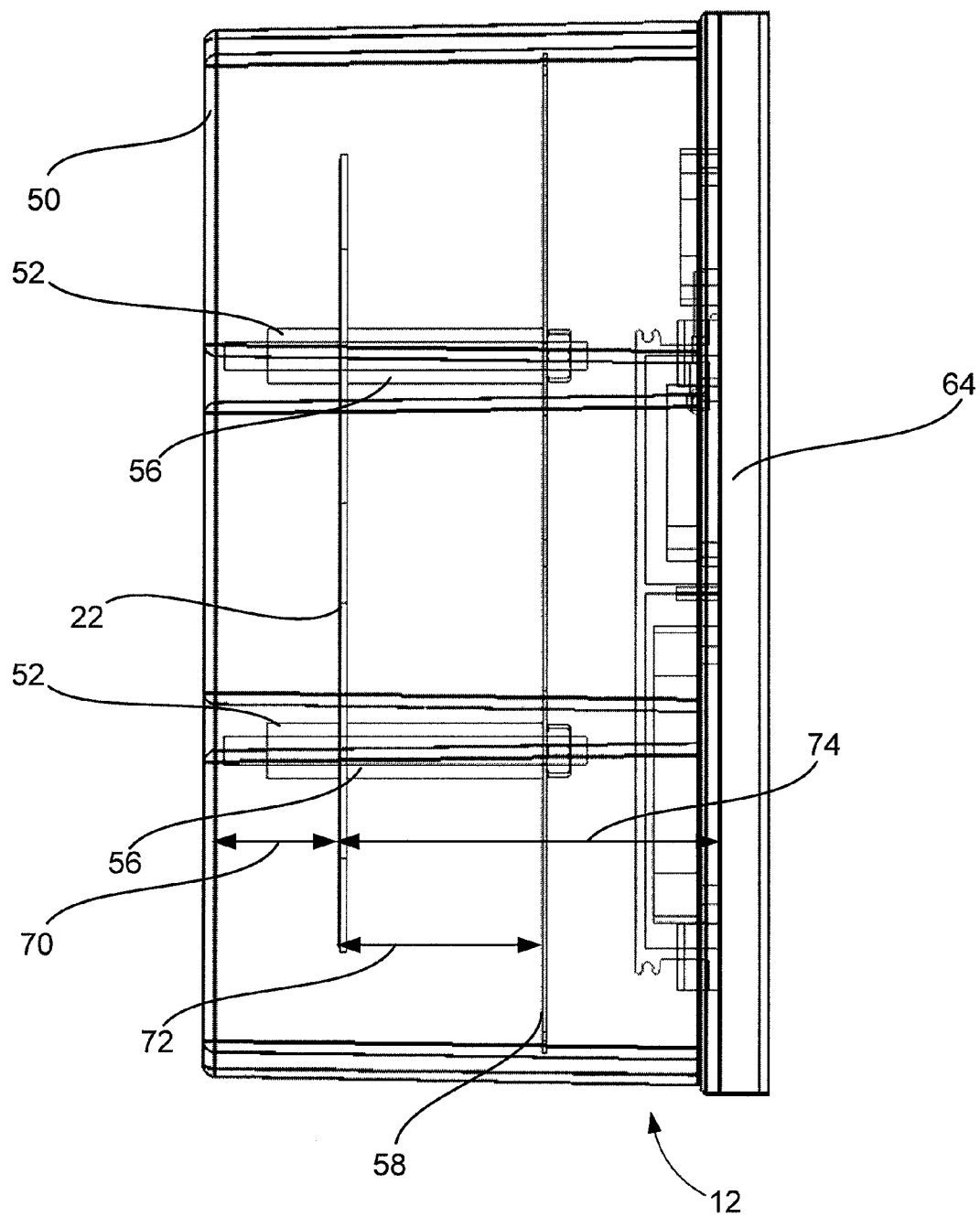
FIG. 6 is a cross-sectional view of the detector apparatus of FIG. 4.

FIG. 6 illustrates a side profile cross section of an assembled embodiment of a detector apparatus (12). In one example, the dimensional size of the reflector plate (58) is 5.75"×8.98". In a mobile equipment application, it is desirable to create a detection zone (14) shape that has a width extending slightly beyond either side of the equipment such as 10 feet, and an extension to 20 feet beyond the detector apparatus (12). To achieve such a detection zone (14) shape, the antenna to reflector plate spacing (72) is set to the 1.500"-3.125" range, the antenna to weatherproof cover spacing (70) is set to 0.375"-∞, and the antenna to heatsink plate spacing (74) is set to 2.750"-4.200". The final spacing values are influenced by the design parameters listed in the previous paragraph.

Figure 7:
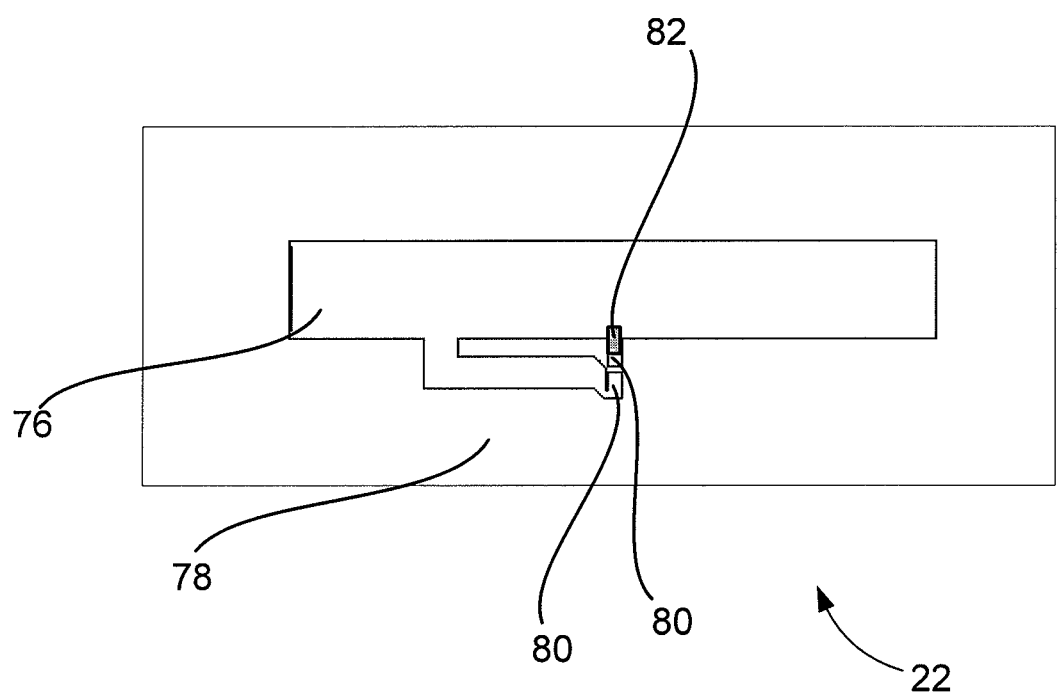
FIG. 7 is a single element version of the antenna for use in the detector apparatus, in accordance with an embodiment of the present disclosure.

FIG. 7 illustrates an embodiment of a single element version of the antenna (22). This embodiment has been designed and tuned for optimal detection of RFID safety tags (16) over a 865-928 MHz frequency range, though other embodiments using other frequencies are possible. The antenna (22) comprises an area (76) made of copper, such as 2 oz copper, bonded to a printed circuit board (78) preferably manufactured from 0.063" FR-4 material, though other embodiments using other copper weights and printed circuit boards materials and thicknesses are possible depending on their application. Connector holes (80) are used to connect the antenna (22) to the cable leading to the RFID reader module (66). A tuning array (82) comprising capacitive, resistive and inductive elements is used to match the impedance of the antenna (22) to the impedance of the cable leading to the RFID reader module (66). The layout of the area (76), the copper weights, the printed circuit board size, material and thickness, and the composition and values of the elements in the tuning array (82) are factors relating to the creation of the detection zone (14).

Figure 8A:
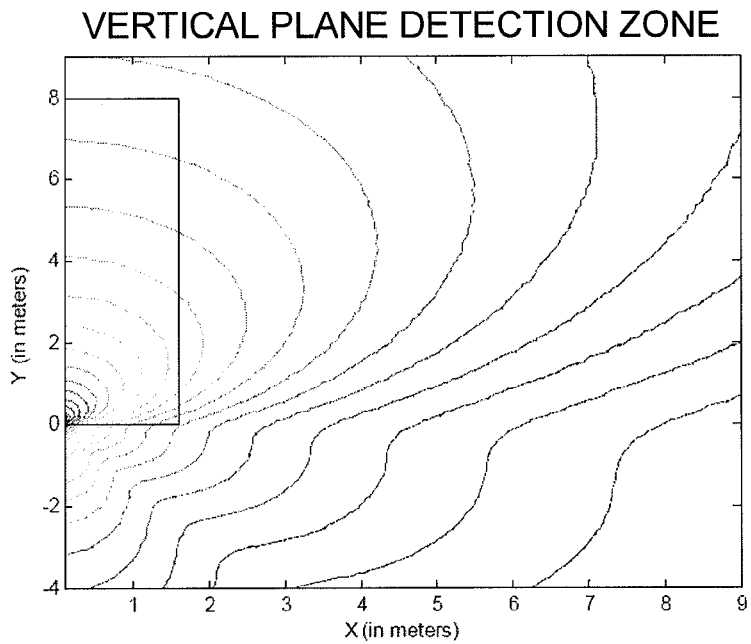
FIGS. 8a and 8b are vertical and horizontal plane contours of equal potential detection for the antenna of FIG. 7.
Figure 8B:
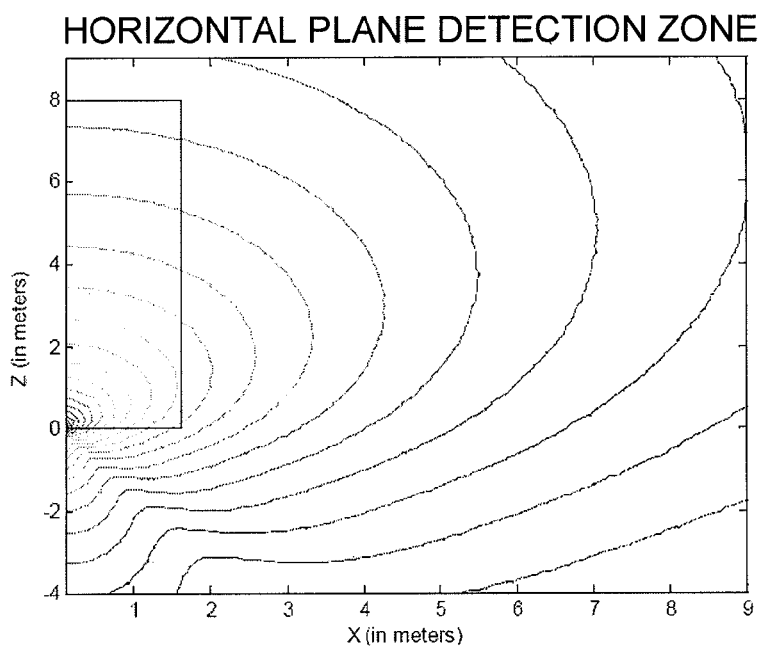

The resulting horizontal and vertical plane contours of equal potential detection are shown in FIGS. 8a and 8b for a single element version of the antenna (22). The resulting wide equal potential detection levels are well suited for personal safety clothing (18) detection. Some applications of the RFID detection system (10) may require a narrow detection zone (14). In such cases, a multiple element version of the antenna (22) may be required.

Figure 9:
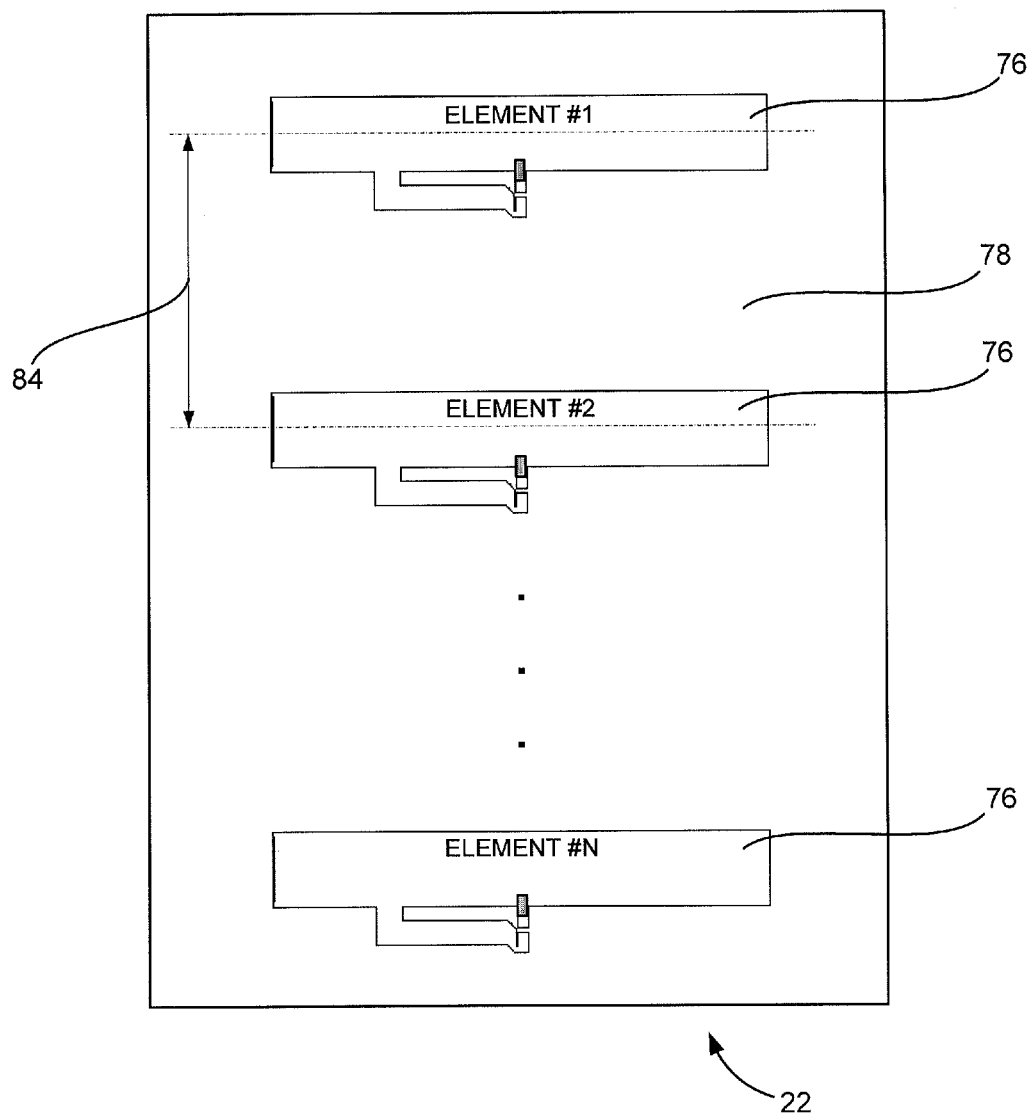
FIG. 9 is a schematic diagram of a vertically arranged multiple element embodiment of an antenna.

An embodiment of a vertically stacked multiple element version of the antenna (22) is shown in FIG. 9. In this embodiment two or more areas (76), preferably copper, are arranged vertically on the printed circuit board (78) and are spaced by a vertical separation distance (84). The vertical separation distance (84) can be equal between the copper areas (76), or can also be variable depending on the element's positional relationship relative to the first and last copper areas (76) of the vertical stack.

Figure 10:
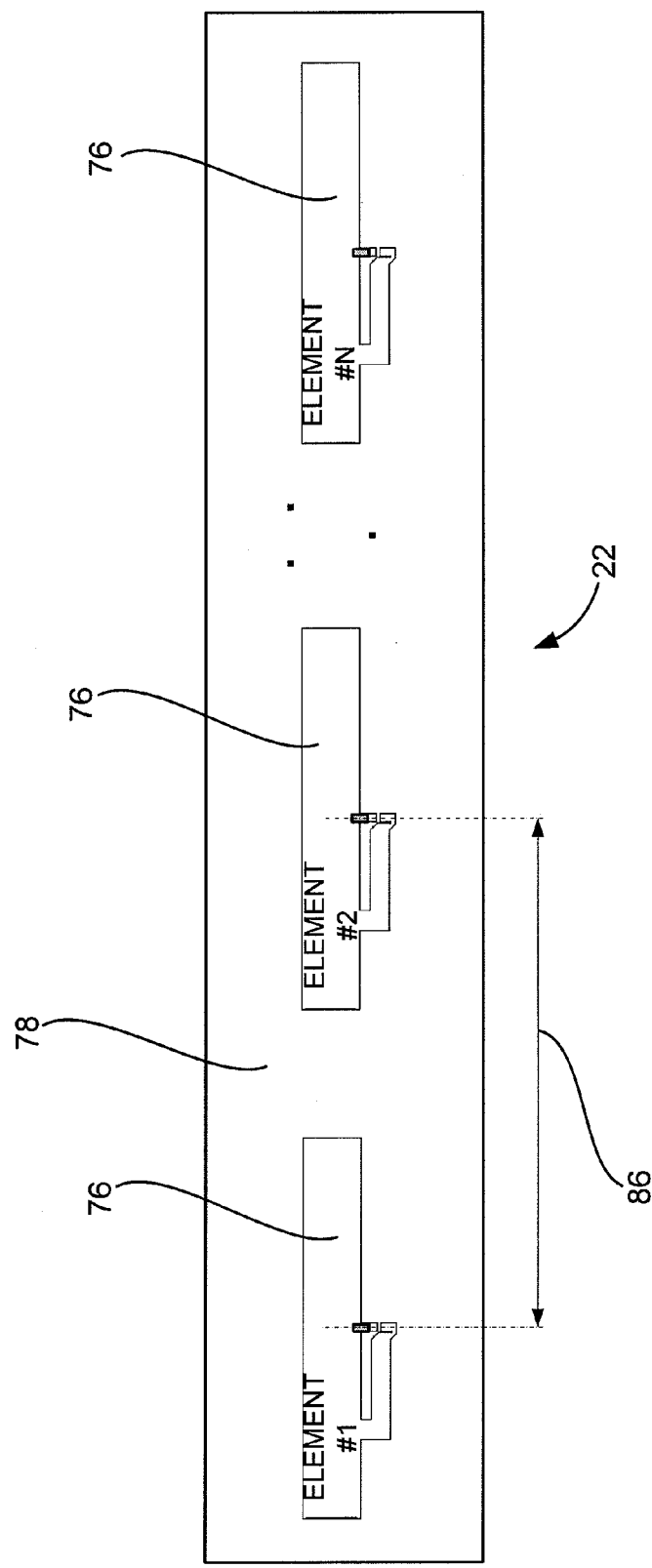
FIG. 10 is a schematic diagram of a horizontally arranged multiple element embodiment of an antenna.

An embodiment of a horizontally stacked multiple element version of the antenna (22) is shown in FIG. 10. In this embodiment two or more areas (76), preferably copper, are arranged horizontally on the printed circuit board (78) and are spaced by a horizontal separation distance (86). The horizontal separation distance (86) can be equal between the areas (76), or can also be variable depending on the element's positional relationship relative to the first and last copper areas (76) of the horizontal stack.

The design of an antenna (22) for the creation of a narrow detection zone (14) depends on several factors including, but not limited to the number of elements, the vertical separation distance (84), the horizontal separation distance (86), the printed circuit board size, material and thickness, and the impedance matching circuitry between the copper areas (76). These design parameters are not obvious even to those skilled in the art and must be carefully designed, simulated, and tested.

Figure 11:
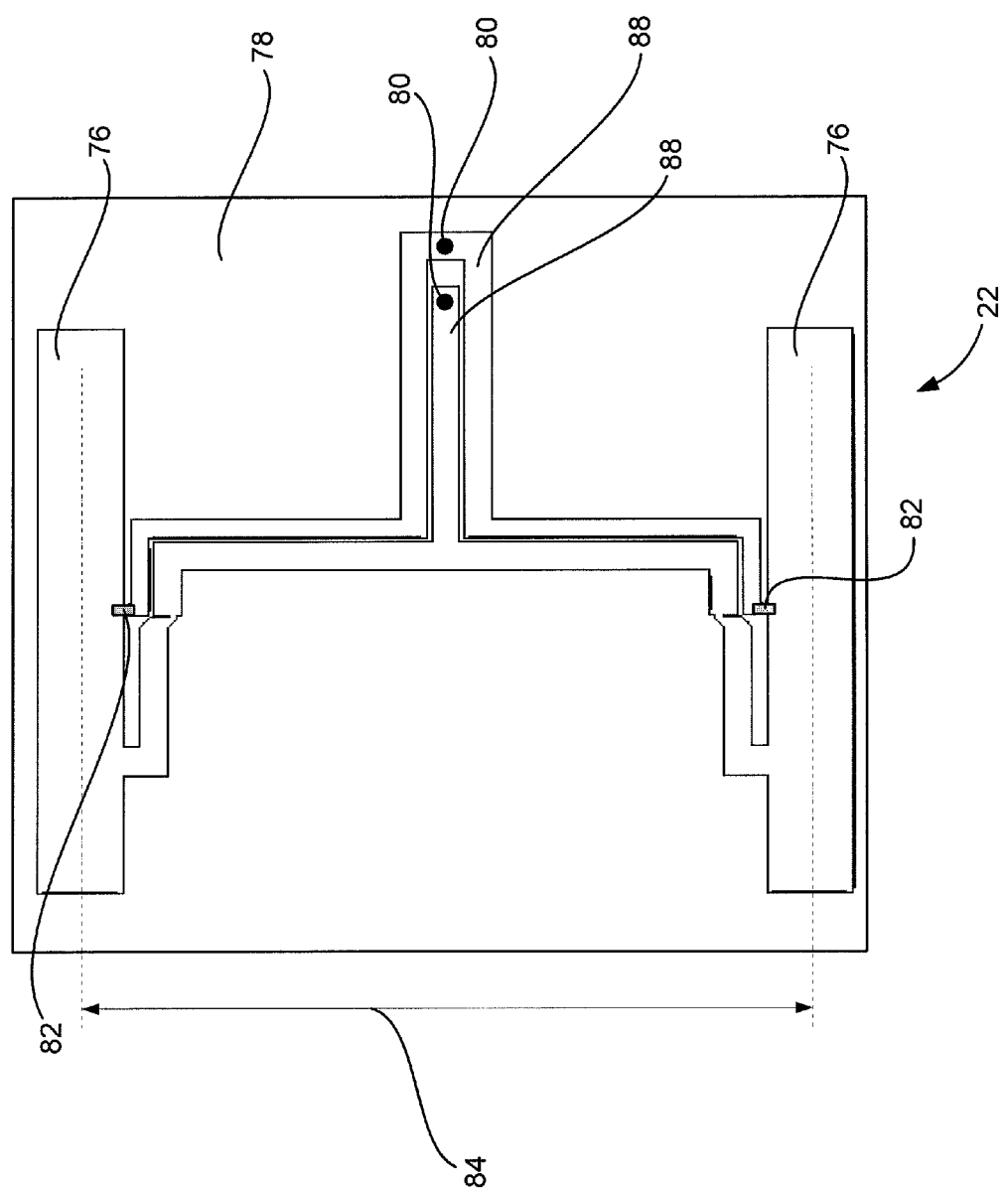
FIG. 11 is a schematic diagram of a vertically arranged dual element impedance matched version of the antenna, in accordance with an embodiment of the present disclosure.

FIG. 11 provides a top view of a vertically stacked dual element impedance matched version of the antenna (22) that provides a narrowed detection zone (14) suitable for the detection of personal safety clothing (18). The vertical separation distance (84) may range between 4.00" and 9.50", depending on the desired level of beam narrowing. A vertical separation distance (84) value of 6.30" and a printed circuit board (78) with dimensions of 7.3"×6.5" is used in the preferred embodiment. In the example of FIG. 11 the impedance matching traces (88) that are used to connect the coaxial cable connector holes (80) to the copper areas (76) and the tuning array (82) are also shown. A tuning array (82) comprising of one or more series connected RF grade capacitors with a net capacitance value between 0.5 pF and 1.5 pF is capable of matching the impedance of the two copper areas (76) through the impedance matching traces (88) to the impedance of the cable leading to the RFID reader module (66). Other values and range limits are possible without departing from the spirit and scope of this disclosure.

An RFID safety system may comprise one or more RFID detection systems (10) that may or may not be within communication range of each other. In an embodiment where wireless communications are used between the detector apparatus (12) and the indicator apparatus (20), communications interference may be minimized through the use of pairing the detector apparatus (12) and the indicator apparatus (20) in the one-to-one relationship. Additional means of minimizing communications interference includes the use of frequency hopping among RF channels, the use of dedicated RF channels, the use of listen before talk algorithms, and the use of other RF interference reduction methods.

Figure 12:
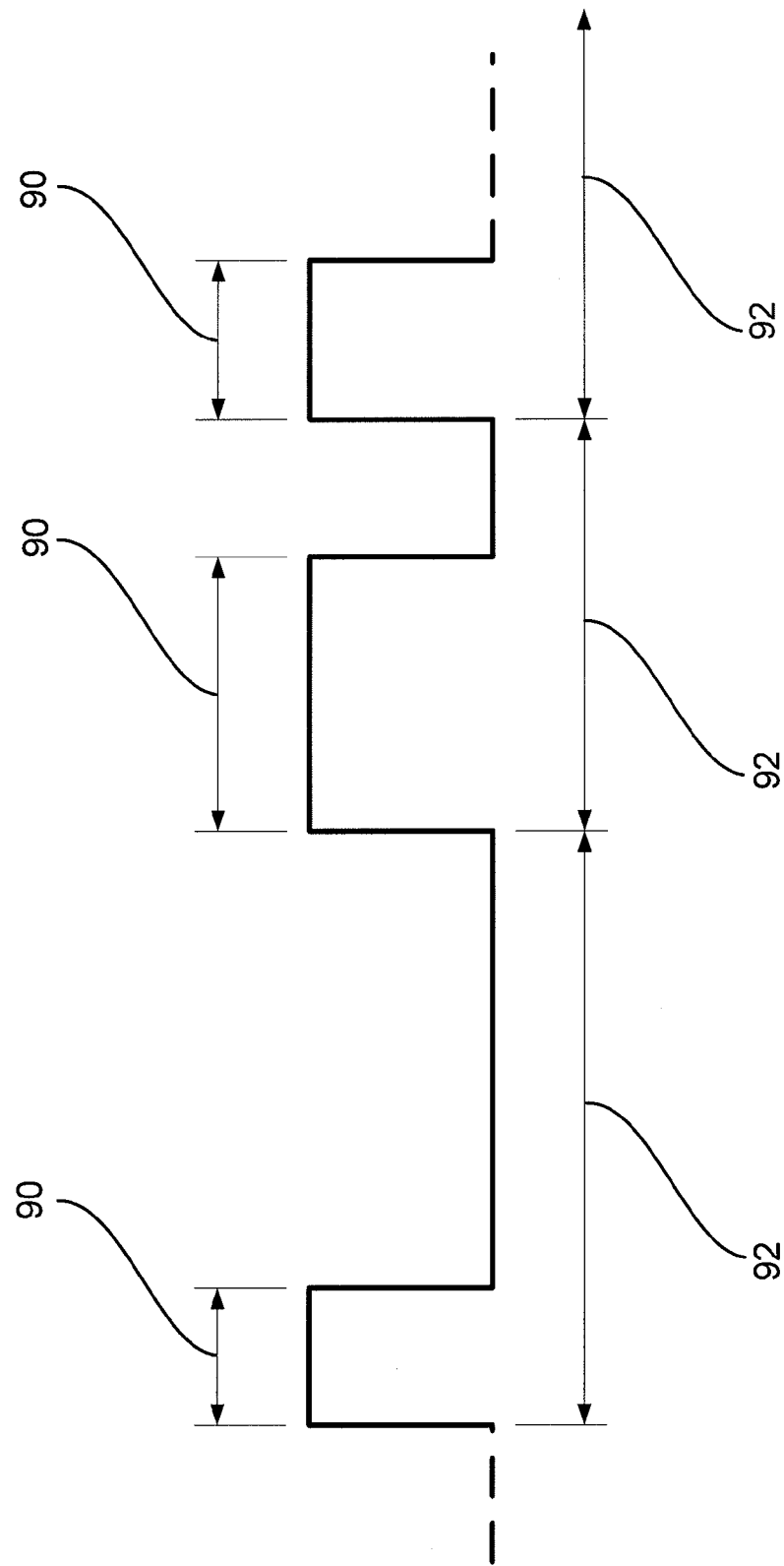
FIG. 12 is a radio-frequency (RF) transmission timing profile of an interference minimizing transmission methodology.

Interference may also be caused when personal safety clothing (18) is simultaneously scanned by detector apparatus (12) from more than one RFID detection system (10). In such cases, the RF based handshaking between the detector apparatus (12) and either the RFID safety tag (16) or throughput detection RFID tag (6) may be compromised. To reduce the possibility of this issue, a unique methodology for minimizing the occurrence of simultaneous scanning by multiple detector apparatuses (12) may be implemented. FIG. 12 illustrates the RF transmission timing of one embodiment of such a methodology in which each scan from the detector apparatus (12) comprises a random transmission time (90) and a random transmission delay time (92). The controller in a first detector apparatus (12) initiates a scan for an RFID safety tag (16) or throughput detection RFID tag (6) by requesting that its RFID reader transmit an RFID protocol containing either a fixed or randomly selected number of transmission slots and transmission retries within the time period defined as the random transmission time (90). On initiation of a scan, the detector apparatus (12) also generates a random transmission delay time (92) in which no additional transmission requests are made to the RFID reader, thereby generating a window of time where a different detector apparatus (12) may scan the personal safety clothing (18) in a non-simultaneous manner. The random transmission time (90) can be comprised of one or more transmission retries each comprising one or more transmission slots. The random transmission delay time (92) can be set to any value greater than the random transmission time (90). The values of the random transmission time (90) and the random transmission delay time (92) that yield optimal tag detection performance in the presence of one or more RFID detection systems (10) are not obvious. In a preferred embodiment, the random transmission time (90) may be fixed at approximately 48 milliseconds using 2 transmission retries, each comprising 16 transmission slots. In the preferred embodiment, the random transmission delay time (92) may be varied between 55 milliseconds and 450 milliseconds. Other values and range limits are possible without departing from the spirit and scope of this disclosure.

Figure 13:
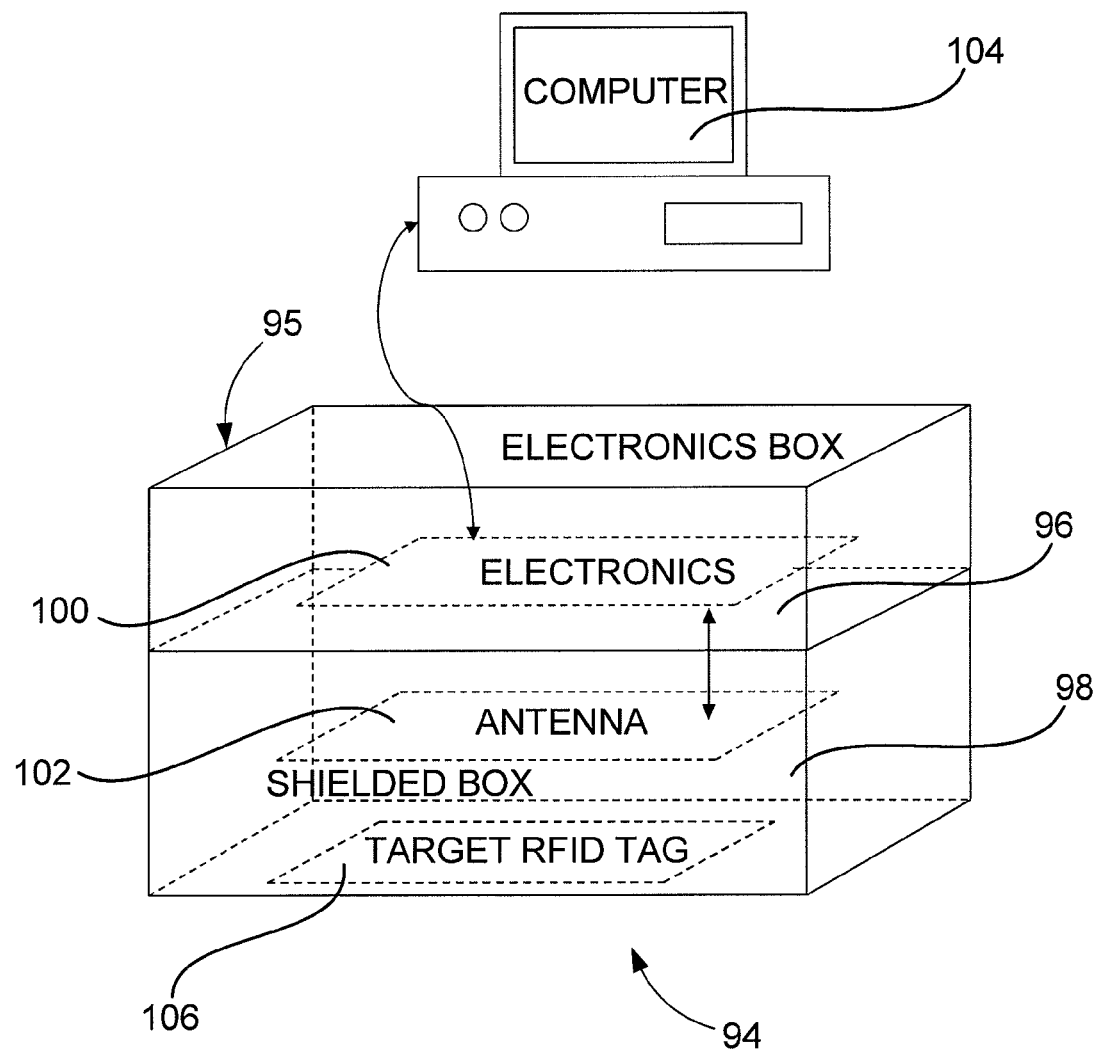
FIG. 13 is a schematic diagram of an RFID tag programming system.

FIG. 13 illustrates a tag programming system (94) that can be used to program either a RFID safety tag (16) or a throughput detection RFID tag (6) typically prior to its use in the field or insertion in a piece of personal safety clothing (18). A box (95), preferably sized to fit a palm so that it is hand held, contains two compartments, an electronics compartment (96) and a shielded compartment (98). The electronics compartment (96) contains the electronics (100) of the system (94). A coaxial cable connects the electronics (100) to an antenna (102) which is located in the shielded compartment (98). The bottom of the shielded compartment (98) is open and the remaining walls are conductive to reduce the amount of or prevent RF signals from entering or leaving the box (95). The electronics (100) contain at least one interface to a computer (104). The computer (104) may be connected to a network containing other computers and servers. The electronics (100) contain an RFID reader that is used to read and write RFID tag information on a target RFID tag (106) via the antenna (102). The antenna (102) is designed to limit communications with a target RFID tag (106) to the confines of the shielded compartment (98) so as not to inadvertently program other RFID tags outside and in the vicinity of the shielded compartment (98). The computer (104) runs software or at least one module that allows the information to be placed on the tag to be configured, to write the information to the target RFID tag (106), and to read back and verify the information previously written to the target RFID tag (106). This data is written to the memory banks which are located within each RFID tag.

An RFID tag that comes from the factory is typically not pre-configured to work with an RFID detection system (10) that validates detected RFID tags. Therefore, for such a system, each RFID safety tag (16) and throughput detection RFID tag (6) should be programmed by the tag programming system (94) to include information within the tag which makes the tag uniquely identifiable and readable to the detector apparatus (12). The tag programming system (94) can be used to enter this information into the memory bank contents of each target RFID tag (106) which is to be deployed in the field. Typical operation of the tag programming system (94) has the user configure the information to be programmed on the target RFID tag (106), which may be automated, and then place the open end of the shielded compartment (98) over the target RFID tag (106) to be programmed. The user then indicates that the tag is ready to be programmed. This can be done through a keyboard, a mouse, or other peripheral on the computer (104) itself or a button or other input device mounted on the electronics (100). Once the user has indicated that the target RFID tag (106) is ready to be programmed, the computer (104) instructs the electronics (100) to program the information to the target RFID tag (106) and then instructs the electronics (100) to read back the information on the target RFID tag (106) for verification. Either the electronics (100) or the computer (104) then verifies the information and displays the status of the operation to the user on its display. This status may be displayed on the computer's (104) monitor or with an audio indication from the computer (104) or with visual and audio indication from components connected to the electronics (100) and visible on the electronics compartment (96) or other known indication methods. Upon successful programming and verification, the target RFID tag (106) is deemed ready for use as a RFID safety tag (16) or a throughput detection RFID tag (6). The process is then repeated for the all RFID tags.

In the preferred embodiment, the information written to the RFID memory banks includes an identifier to indicate the type of apparel which the RFID safety tag (16) belongs to, and a tag ID to indicate the type of the RFID safety tag (16) embedded in the apparel. A unique serial number identifying the apparel, a unique customer ID, and a position identifier indicating the location of the particular RFID tag on the piece of apparel may be written to the RFID safety tag (16) memory banks as well. The information which is entered onto each target RFID tag (106) during the programming time is stored in a database for tracking purposes. Storing this information in a database is useful since it ensures that target RFID tags (106) are not duplicated by the tag programming system (94) when a tag is programmed. This information may also then be stored in the detector apparatus (12) or indicator apparatus (20) to further enhance the security and accuracy of the system (10). The RFID tag programming apparatus (94) may also incorporate all computational electronics on board which store programmed tag information for transmission to a database at a later time.

In the preferred embodiment, the RFID tag programming apparatus (94) may be used to enter a digital signature into a target RFID tag (106) during programming when an appropriate tag that supports the digital signature scheme is used. The digital signature information is designed to detect valid RFID safety tags (16) and throughput detection RFID tags (6), and to reduce the chance of the counterfeiting of RFID equipped clothing or apparel in the field. RFID safety tags (16) and throughput detection RFID tags (6) which are enabled with digital signature information will return this information back to the detector apparatus (12) when the RFID tag is read. The detector apparatus (12) recognizes the digitally signed RFID safety tags (16) and throughput detection RFID tags (6) and will act accordingly by validating the digital signature. If the RFID tag has been determined to be a genuine tag, the detector apparatus (12) will alert the indicator apparatus (20) that a tag has been detected. In the event that the detector apparatus (12) encounters an RFID safety tag (16) or throughput detection RFID tag (6) that is deemed to be counterfeit, the system will enter a mode which will notify the operator that one or more counterfeit RFID tags have been detected. In a preferred embodiment, the system will continue to operate as a safety device in the presence of counterfeit RFID safety tags (16) or counterfeit throughput detection RFID tags (6), but will also notify the operator about the presence of the counterfeit tag(s) through the use of the indicator apparatus' (20) visual status indicators. This information regarding counterfeit tags may be collected and used for other determinations.

Figure 14:
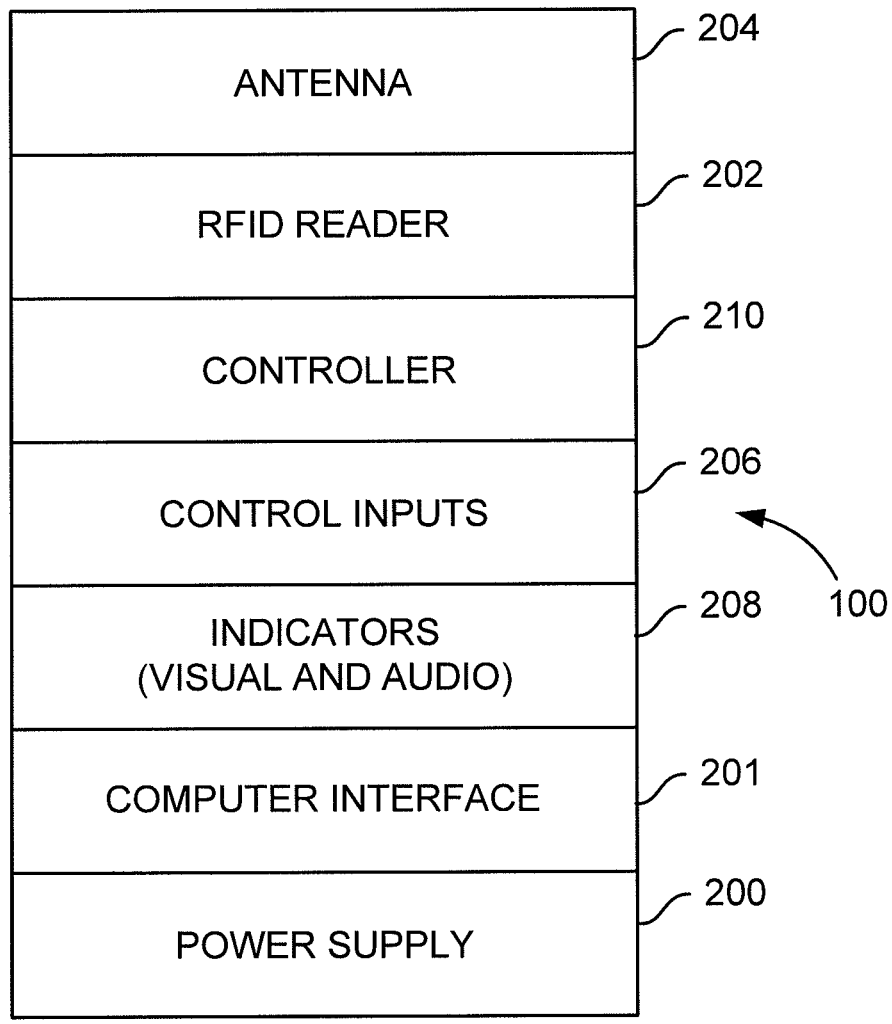
FIG. 14 is a block diagram of tag programmer electronics used in the RFID tag programming system of FIG. 13.

FIG. 14 is a schematic of the electronics (100) of the tag programming system (94). The power supply (200) takes power from an external source and converts it to the correct voltage and current levels required for the rest of the function blocks or may be a stand-alone power source. The external power source may be connected to the electronics (100) through a separate input or may be brought in over a computer interface (201). The RFID reader (202) and antenna (204) allow reading and writing of information to the RFID tags. The computer interface allows for communications with a computer. Control inputs (206) allow the user to indicate when an RFID tag is ready to be programmed, as well as, to allow the operator to control other features such the volume level of the audio indicator or to manually read in information from an RFID tag. Indicators (208), both audio and visual, allow the system to quickly indicate to the user the status of the programming operation, as well as, the status of the system or other actions initiated by the user. The controller (210) coordinates all the actions among the control inputs (206), visual and audio indicators (208), RFID reader (202) and computer interface (201).

Figure 15:
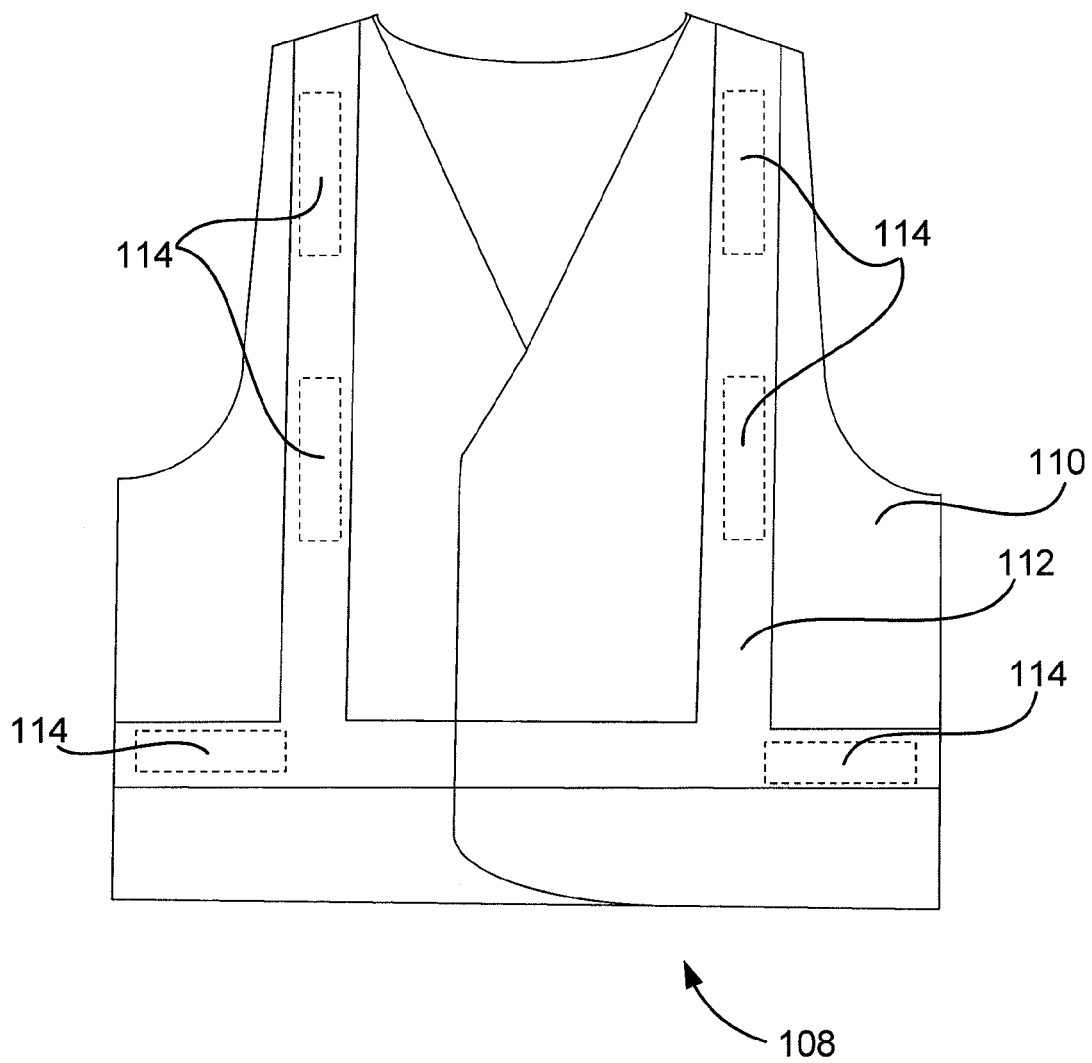
FIG. 15 is a front view of a safety vest with RFID tags.
Figure 16:
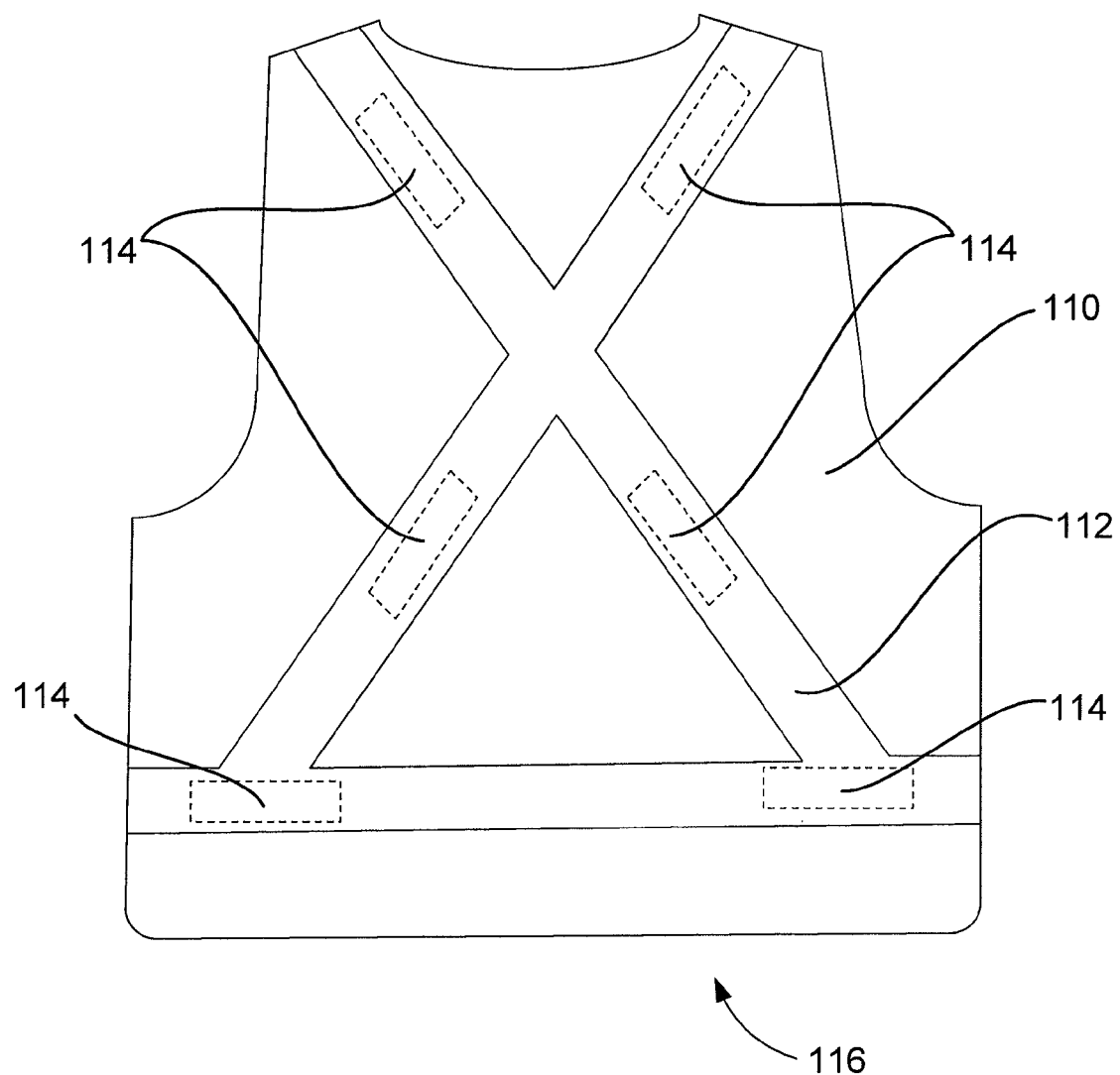
FIG. 16 is a rear view of the safety vest of FIG. 15.

FIGS. 15 and 16 illustrate the front and back of a piece of personal safety clothing (16) seen as a RFID tag equipped safety vest (110) worn in the field by workers to trigger their detection by the detector apparatus (12). It is important for workers to wear this safety clothing, or equipment, in the field on jobsites which pose potential hazards. Some of the main safety clothing or equipment used by workers include, but are not limited to, safety vests, safety harnesses, hard hats, gloves, and safety boots. RFID tags may easily be embedded in any of these safety apparel or other types of equipment.

In the vest of FIGS. 15 and 16, the RFID equipped safety vest (110) comprises of a tear-away nylon mesh that is fitted with retro-reflective strips (112). The tear-away vest includes a number of hook and loop fastener contact points on the vest which will allow the vest to come apart at these points of contact if any portion of the vest is caught on machinery or other structures. The retro-reflective strips (112) of the vest provide enhanced visibility by reflecting light back to its source with a minimum scattering of the light.

Each RFID safety vest (110) contains a number of RFID tags (114) embedded at defined locations throughout the vest. The RFID tags (114) are placed on the vest with varying orientations. The orientation of a RFID tag (114) on a vest can be in any plane, though the preferred embodiment is comprised of a combination of tags oriented in the vertical, horizontal and diagonal planes. The orientation of a RFID tag (114) can alter the effective detection by the detector apparatus (12) depending on the orientation of the RFID tag compared to that of the detector apparatus' antenna (22). A number of RFID tags (114) may be placed in different orientations around the vest in a way that provides effective detection by the detector apparatus (12). Each RFID tag (114) location on the front and back of the RFID equipped safety vest (110) is assigned a unique ID which assists in identifying the position on a vest which is being detected. This unique ID may be programmed by the programming interface (94).

Figure 17:
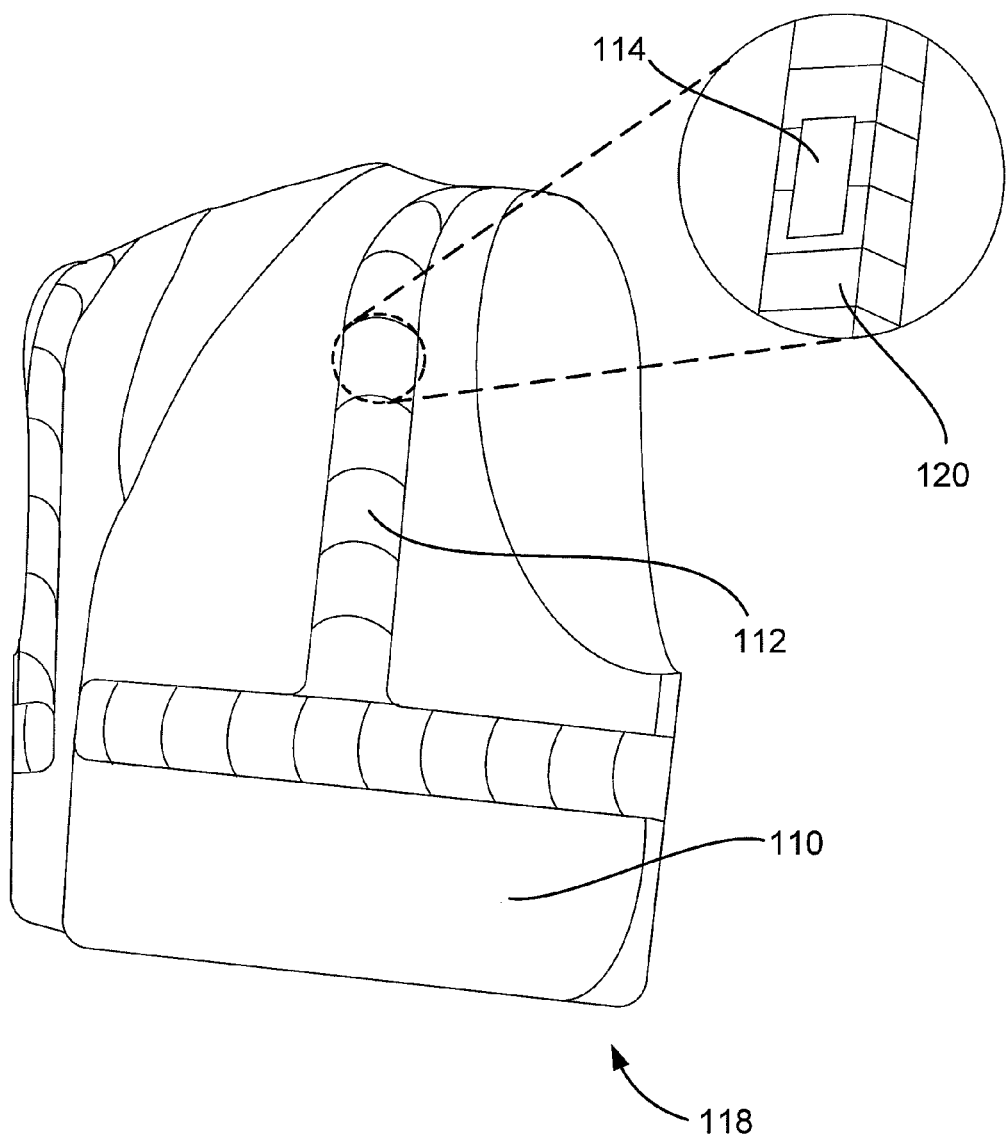
FIG. 17 is a perspective view of a safety vest used in the RFID safety system.

FIG. 17 is a closer view of an RFID tag integrated within a piece of personal safety clothing. Located below the retro-reflective strips (112) is a raised foam layer. Unlike an ordinary vest, the RFID safety vest (110) of FIGS. 15 and 16 has a foam layer that is sewn in between the vest body and the retro-reflective strips (112) which effectively raises the strips (112) out and away from the body. The purpose of the raised retro-reflective strips (112) is to provide a three-dimensional (3D) effect which may provide better visibility of the vest for the wearer, and to allow for improved detection of the RFID tags (114). The foam backing (120) may be tailored and optimized in thickness and density to provide reliable tag readability when the RFID tags (114) are located close to the body.

Figure 18:
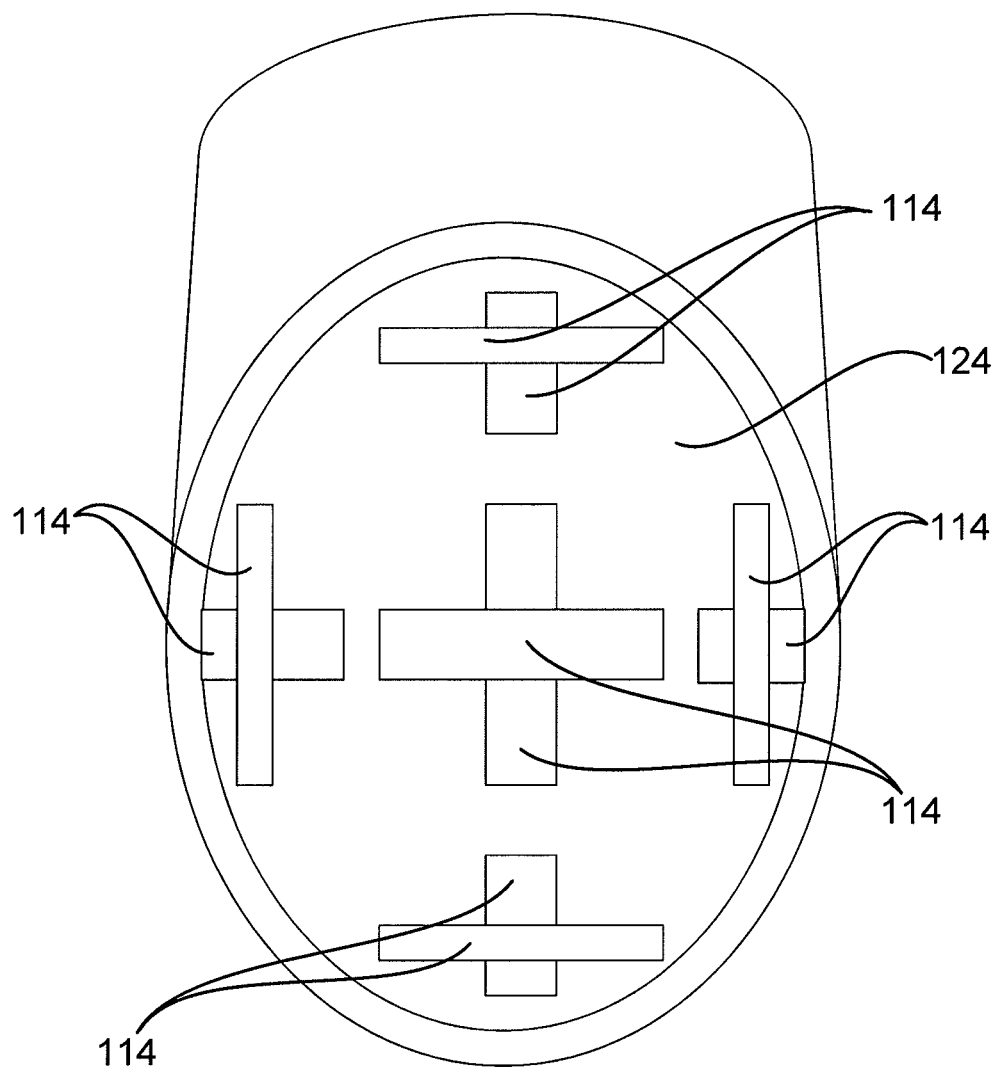
FIG. 18 is a bottom view of an RFID hardhat.

FIG. 18 illustrates a schematic diagram of another embodiment of personal safety equipment being enhanced with integrated RFID tags. In this embodiment, the personal safety clothing (16) is a hard hat (124). FIG. 18 provides an example of the positioning of RFID tags placed inside the RFID tag equipped hard hat (124). As shown, the RFID tags (114) are strategically placed inside the hard hat to provide enhanced detection by the detector apparatus (12) for a worker wearing the hard hat (124). In the embodiment shown, the orientation of the RFID tags (114) placed inside the hard hat is varied between the horizontal and vertical planes. Other orientations and tag placement locations are possible without departing from the spirit and scope of this disclosure. A worker may choose to compliment their level of detection in the field by combining the RFID equipped safety vest (110) and RFID tag equipped hard hat (124) or other types of safety clothing or apparel. By outfitting workers with a plurality of RFID equipped clothing, the chance of detecting these tags when the worker is in a hazardous position is increased which also reduces the chance of injury to the worker. The detector apparatus (12) is programmed to detect more than one piece of RFID equipped apparel in the field when worn together by a worker.

The programming scheme of an RFID tag (114) also allows each tag to contain information which can identify which worker a piece of RFID equipped apparel belongs to, the time and date the apparel was programmed and also manufactured. Based on this information scheme, the detector apparatus (12) can filter out all RFID tags (114) that are detected which have not been programmed via the tag programming system (94) programming scheme. This is an effective method of filtering out any possible RFID tags which would otherwise interfere with the detection of the RFID equipped apparel. This information scheme also provides the ability to track statistics which would indicate the number of tags which are functioning properly on a vest. The unique tag position ID scheme also allows individual apparel to be tracked and monitored. The RFID detection system may be mesh networked over the field of operations and tag detection data may be collected, stored and analyzed to generate site specific safety performance statistics. Such safety performance statistics may be utilized to generate an operational understanding of the site safety, which may include, but is not limited to, information on how many times tags from a certain worker's safety apparel were previously detected, the frequency and date/time stamp of the detection of the worker, the orientation of the detected worker relative to the detector apparatus (12), or whether or not a hardhat was detected along with the safety vest. Each RFID equipped vest preferably has the same number of RFID tags (114) inserted between the retro-reflective strips (112) and the foam backing (120) on both the front and the back of a vest.

As RFID equipped personal safety clothing (18) is used more often in the field, the life expectancy of a RFID safety tag (16) drops. Eventually a RFID safety tag (16) may not respond to commands or pulses transmitted by the detector apparatus (12) and become ineffective in providing any level of protection to a worker. This is an undesirable situation in the field as the RFID safety tags (16) are used to detect and protect an individual.

Figure 19:
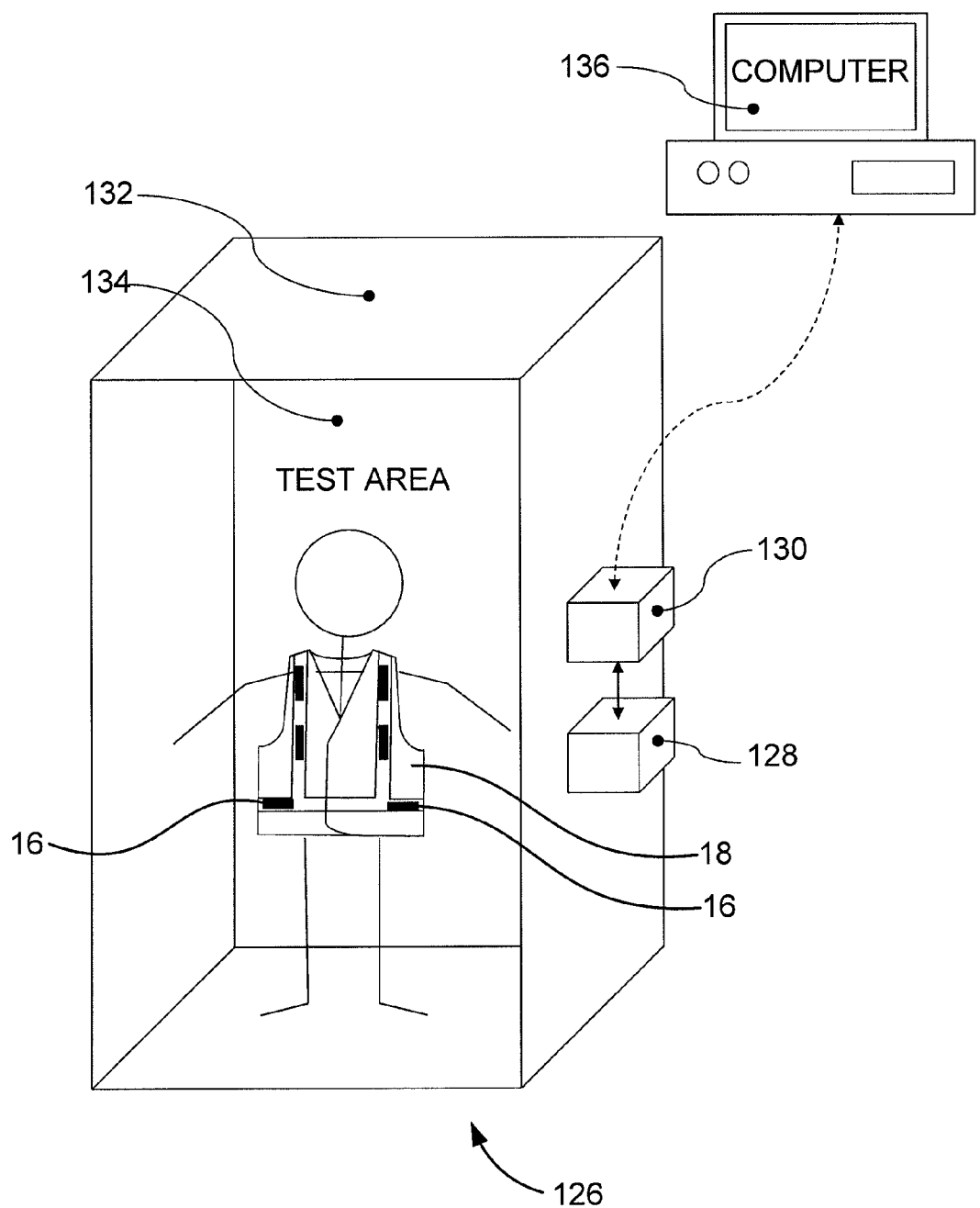
FIG. 19 is a schematic view of an RFID tag testing system.

FIG. 19 illustrates an embodiment of the tag testing system (126) used to test the operation, or effectiveness of tags with an article personal safety clothing (18) worn by a worker. The system (126) employs a modified detector apparatus (128) and a modified indicator apparatus (130) mounted in the wall of the test booth (132) which encloses a test area (134). The modified indicator apparatus (130) is mounted so that it is visible to the user in the test area (134). The test booth (132) may be a walk in or walk through style booth or even just a simple doorway or portion of a hall. It may also be similar to a metal detector such as those used in airports. The modified detector apparatus (128) is similar to the detector apparatus (12) except the antenna, reflector plate, and spacings of components within the detector apparatus (12) may be modified to provide a detection zone that corresponds with the test area (134). One or more modified detector apparatus (128) may be used with multiple orientations for improved detection of randomly oriented tags. As well, both the software that is used for the detector apparatus (12) and indicator apparatus (20) may be slightly modified in order to accommodate this new use.

The modified indicator apparatus (130) is also similar to the indicator apparatus (20) except for the addition of a new operator control, a pushbutton or some other device that detects the presence of an individual, which instructs the system to start a new test. The modified indicator apparatus (130) may also have modified visual or audio indicators that would better display the results of the test, such as a numerical readout.

Typical operation of the tag testing system (126) has the user enter the test area (134) while wearing at least one article of personal safety clothing (18) containing the RFID safety tags (16) to be tested. The user activates the pushbutton or other control on the modified indicator apparatus (130) to start the test. The user then turns slowly as the modified detector apparatus (128) attempts to detect the RFID safety tags (16) in the personal safety clothing (18). Information stored on a detected tag is retrieved and used to associate the tag into groups, such as safety vests, hard hats, or other types of safety apparel. The information from the detected RFID safety tags (16) is transmitted to the modified indicator apparatus (130) which then transmits the information to a computer (136) where the results of the test are displayed or stored, or both. In this manner, an individual reviewing the results may be able to determine if there are any RFID tags associated with the testing which are no longer operational and require fixing or replacement.

Figure 20:
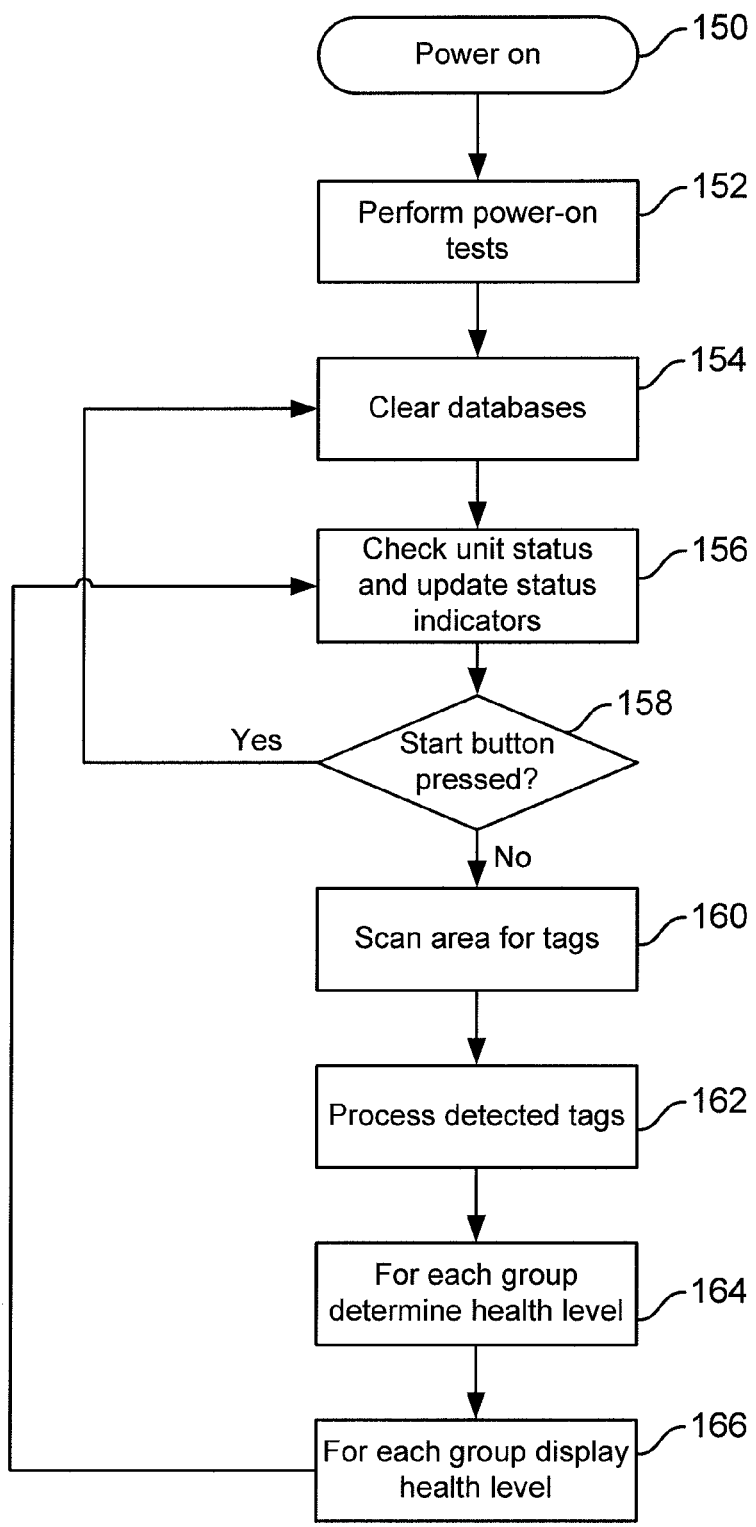
FIG. 20 is a flowchart for an RFID tag testing system.

FIG. 20 illustrates the operational flowchart for a preferred embodiment of the tag testing system (126). When the tag testing system (126) is powered up (150), the microcontroller in the modified indicator apparatus (130) may perform several tests (152) on the system to make sure it is operational. These may include checking the battery level and turning on and off all the indicators so that the operator may discern a defective indicator. If everything is in order, the microcontroller clears the databases (154), such as a group test item database and a tag database. Next, the unit status may be checked and the status indicators updated (156).

The system then waits for, or checks for, a start button pressed condition (158). When this occurs, the databases are cleared again (154) to ensure that any RFID tags that were detected before the instant of a start button press have been discarded. After the databases are cleared, a signal is transmitted to the modified detector apparatus (128) to scan (160) the test area for tags. If any tags are detected, this information is transmitted to the modified indicator apparatus. Information associated with the detected tags is then stored in a tag database within and processed (162) by the computer. This information may also be collected and stored within group databases so that tags associated with a specific piece of personal safety clothing is collected together. The processor then determines, for each group type, the health level of the selected test item and its tags (164). The group health levels on the respective group health level indicators are then displayed (166), where 'group' means an assortment of tags of a certain type of apparel (ie: Hard Hat, Safety Vest) collocated on the same item of apparel (ie: a specifically identified Hard Hat or Safety Vest). The processor then continues to wait until the next start button press.

Furthermore, when scanning for tags, in addition to tags from the desired items to be tested, there may be occasional "spurious" tags detected that belong to other "spurious" items that are in the area but are not being tested. For instance, if the user wishes to test the tags in the hard hat, it is desired that the detector ignore all tags associated with a safety vest. In this process, the processor determines which tags are "spurious" and ignores them. In one embodiment of this disclosure, all detected tags are recorded in the tag database for all groups until the number of tags for one item in a group show a clear majority or meets a certain threshold level. At this point, that item is selected as the test item for the group and entered into the group test item database. From that point on, all other tags detected that belong to the group but not to the test item for that group are ignored. Any tags already in the database that belong to a group but not the selected test item for the group may be deleted from the tag database.

The health level of a tag may be broken into five levels:
1. No detection—no significant number of tags for any single item in the group were detected.
2. Detected—a minimum number of tags from multiple items in the group were detected but not enough to select a single item as the specific item for testing.
3. Selected—enough tags were detected from one item in the group to select it as the test item for that group.
4. Fair—the number of detected tags from the selected test item in the group reached the "fair" threshold.
5. Pass—the number of detected tags from the selected test item in the group reached the "pass" threshold.

For certain group types, if the health level has reached the "fair" level, then additional checks may be made to increase the number of detected tags for determining if a "pass" level has been achieved. In this case, a set of rules based on tag positions of detected tags may be used to change the status of an undetected tag position to that of being detected. This increases the tag count for the selected test item by one for the purposes of determining a "pass" level. For instance, suppose a tag in position A is undetected but tags in positions B and C are detected. Then if a rule states that detection of tags in positions B and C can compensate for the non-detection of a tag in position A, then the tag count is increased by one for the purposes of determining a "pass" condition.

Each visual indicator which is lit up during a test is an indication of a percentage of the maximum number of RFID tags which are present on the RFID equipped apparel. Combinations of RFID equipped apparel may be worn when conducting a test such as wearing a RFID equipped hard hat and RFID equipped safety vest together. The modified indicator apparatus (130) will display the effective level of protection of the combination of the equipment. A computer (136) may be connected to the tag testing system (126) in order to log each test that is conducted for a piece of RFID equipped apparel. If accidents do occur in the field, the tag testing system (126) logs may be checked to determine if a piece of RFID equipped apparel was properly tested before being used in the field.

Another embodiment of this system has the components of the modified detector apparatus (128) and modified indicator apparatus (130) combined into a single unit.

Another embodiment of this system has a wired interface or a wireless interface from the modified indicator apparatus (130) to a computer (136) which may be connected to a network. In this embodiment, the information from the RFID safety tags (16) and the test results are recorded for diagnostic and/or liability purposes.

In an alternative embodiment, the RFID safety system may comprise a detector apparatus located at different locations on a conveyor belt system and an indicator apparatus located near the operator of the conveyor belt system. In this embodiment, the operator may be able to stop the conveyor belt system when one of the detector apparatus senses or determines that a worker is located in a dangerous position with respect to the conveyor belt system.

Another embodiment may have multiple detector apparatuses (12) and indicator apparatuses (20) associated in a group (similar to pairing two devices together). In this case, such groups may be configured in a variety of ways, including but not limited to, one detector apparatus (12) sending information to multiple indicator apparatuses (20), multiple detector apparatuses (12) sending information to a single indicator apparatus (20), or multiple detector apparatuses (12) sending information to multiple indicator apparatuses (20).

While this RFID safety system has been described for application of the detection of workers in the presence of mobile equipment, many other embodiments of this system may be created based on permutations of the previous ideas without changing the scope of the disclosure. Such embodiments include, but are not limited to, the detection of workers in the presence of stationary equipment such as fixed conveyer platforms, stationary crushers and compactors.

In the preceding description, for purposes of explanation, numerous details are set forth in order to provide a thorough understanding of the embodiments of the disclosure. However, it will be apparent to one skilled in the art that these specific details are not required in order to practice the disclosure. In other instances, well-known electrical structures and circuits are shown in block diagram form in order not to obscure the disclosure. For example, specific details are not provided as to whether the embodiments of the disclosure described herein are implemented as a software routine, hardware circuit, firmware, or a combination thereof.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

1. A safety system comprising:
   at least one detector apparatus, the at least one detector apparatus including:
   a radio frequency identification (RFID) reader, having an RFID reader module;
   an antenna for creating a detection zone surrounding the at least one detector apparatus, the antenna having a printed circuit board, a copper area mounted to the printed circuit board, a tuning array, and a cable for connecting the antenna to the RFID reader module; and
   at least one indicator apparatus, in communication with the at least one detector apparatus;
   at least one RFID tag embedded in an article of personal safety clothing;
   wherein when the detector apparatus senses the presence of an RFID tag within the detection zone, the at least one detector apparatus transmits a signal to the indicator apparatus to alert individuals of a presence of the RFID tag.

2. The safety system of claim 1 wherein the detector apparatus further comprises:
   a communications interface for communicating with the at least one indicator apparatus.

3. The safety system of claim 2 wherein the communication interface is either a wireless communication interface or a wired communication interface.

4. The safety system of claim 1 wherein the at least detector apparatus is mounted to a vehicle.

5. The safety system of claim 4 further comprising direction detection input circuitry for determining a direction of the vehicle.

6. The safety system of claim 1 wherein the indicator apparatus comprises:
   a communication interface for communication with the at least one detector apparatus;
   a controller; and
   a set of indicators;
   wherein when the controller receives the signal from the at least one detector apparatus, the controller transmits a signal to the set of indicators to alert individuals of the presence of the RFID tag.

7. The safety system of claim 6 wherein the set of indicators are either audio indicators, visual indicators or a combination of both.

8. The system of claim 1 wherein the tuning array comprises capacitive, resistive or inductive elements.

9. The system of claim 8 wherein the tuning array matches an impedance of the cable.

10. The system of claim 1 wherein the at least one detector apparatus comprises a plurality of antennas.

11. The system of claim 10 wherein the plurality of antennas are vertically spaced apart.

12. The system of claim 10 wherein the plurality of antennas are horizontally spaced apart.

13. The system of claim 1 wherein the personal safety clothing is either a hard hat, a safety vest, a safety harness, a pair of safety gloves, a pair of safety boots or a safety belt.

14. The system of claim 13 wherein the safety vest comprises:
   a set of retro-reflective strips; and
   a layer of foam, located below the set of retro-reflective strips, for housing the at least one RFID tag such that there is a spacing between a wearer's body and the at least one RFID tag.

15. A safety system comprising:
   a detector apparatus mounted on a heavy machinery equipment, the detector apparatus including an antenna and an RFID reader having an RFID reader module, for creating a detection zone surrounding the detector apparatus and for detecting RFID tags within the detection zone; and
   an indicator apparatus, in communication with the detector apparatus and mounted proximate the detector apparatus,
   wherein the detector apparatus transmits pulses to sense the presence of RFID tags within the detection zone and communicates with the indicator apparatus when at least one RFID tag is detected; and
   wherein the indicator apparatus alerts individuals of the presence of the RFID tag when one is detected;
   wherein the antenna includes a printed circuit board; a copper area mounted to the printed circuit board; a tuning array; and a cable for connecting the antenna to the RFID reader module.

16. The safety system of claim 15 wherein indicator apparatus comprises audio or visual indicators for alerting the individuals.

* * * * *